(12) United States Patent
Ma et al.

(10) Patent No.: US 12,075,384 B2
(45) Date of Patent: Aug. 27, 2024

(54) TECHNIQUES FOR FLEXIBLE REFERENCE SIGNAL PATTERNS IN WIRELESS COMMUNICATIONS SYSTEMS

(71) Applicant: QUALCOMM Incorporated, San Diego, CA (US)

(72) Inventors: Jun Ma, San Diego, CA (US); Xiaoxia Zhang, San Diego, CA (US); Qiang Wu, San Diego, CA (US); Tao Luo, San Diego, CA (US); Iyab Issam Sakhnini, San Diego, CA (US); Mehmet Izzet Gurelli, San Diego, CA (US); Ahmed Abdelaziz Ibrahim Abdelaziz Zewail, San Diego, CA (US); Jing Sun, San Diego, CA (US); Wooseok Nam, San Diego, CA (US); Anantha Krishna Karthik Nagarajan, San Diego, CA (US); Peter Gaal, San Diego, CA (US); Zhifei Fan, San Diego, CA (US); Juan Montojo, San Diego, CA (US); Sony Akkarakaran, Poway, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 437 days.

(21) Appl. No.: 17/375,944

(22) Filed: Jul. 14, 2021

(65) Prior Publication Data
US 2022/0070823 A1 Mar. 3, 2022

Related U.S. Application Data

(60) Provisional application No. 63/072,010, filed on Aug. 28, 2020.

(51) Int. Cl.
*H04W 72/02* (2009.01)
*H04L 5/00* (2006.01)
(Continued)

(52) U.S. Cl.
CPC .......... *H04W 72/02* (2013.01); *H04L 5/0051* (2013.01); *H04L 27/26025* (2021.01);
(Continued)

(58) Field of Classification Search
CPC ..... H04L 5/001; H04L 5/0023; H04L 5/0048; H04L 5/0051; H04L 5/0091;
(Continued)

(56) References Cited

U.S. PATENT DOCUMENTS 10,498,477 B2 * 12/2019 John Wilson ......... H04L 5/0051
10,790,956 B2 * 9/2020 Cheng .................. H04L 5/0057
(Continued)

FOREIGN PATENT DOCUMENTS

CN 114391280 A * 4/2022
EP 3641393 A2 * 4/2020 ............. H04L 5/001
(Continued)

OTHER PUBLICATIONS

International Search Report and Written Opinion—PCT/US2021/041898—ISA/EPO—Feb. 9, 2022 (207068WO).
(Continued)

*Primary Examiner* — Eric Nowlin
(74) *Attorney, Agent, or Firm* — Holland & Hart LLP

(57) ABSTRACT

Methods, systems, and devices for wireless communications are described. A user equipment (UE) may receive, from a base station, a first tracking reference signal configuration and a second tracking reference signal configuration. The first tracking reference signal configuration may include a first set of parameters and the second tracking reference signal configuration may include a second set of parameters.
(Continued)

The UE, the base station, or both may identify an indicator for selection from among the first tracking reference signal configuration and the second tracking reference signal configuration. The UE may receive, from the base station and based on the identified indicator for selection, a tracking reference signal in accordance with the first tracking reference signal configuration or the second tracking reference signal configuration.

15 Claims, 20 Drawing Sheets

(51) Int. Cl.
  H04L 27/26    (2006.01)
  H04W 72/0446  (2023.01)
  H04W 72/0453  (2023.01)
  H04W 72/23    (2023.01)
(52) U.S. Cl.
  CPC ... H04W 72/0446 (2013.01); H04W 72/0453 (2013.01); H04W 72/23 (2023.01)
(58) Field of Classification Search
  CPC ............ H04L 27/26025; H04W 72/02; H04W 72/0446; H04W 72/0453; H04W 72/23
  See application file for complete search history.

(56) References Cited

U.S. PATENT DOCUMENTS

| | | | |
|---|---|---|---|
| 10,917,280 B2 * | 2/2021 | Kim | H04L 27/2646 |
| 10,979,273 B2 * | 4/2021 | John Wilson | H04L 1/1657 |
| 10,992,442 B2 * | 4/2021 | Cheng | H04L 5/0007 |
| 11,153,051 B2 * | 10/2021 | Saito | H04L 5/0051 |
| 11,277,302 B2 * | 3/2022 | Cirik | H04W 76/28 |
| 11,290,311 B2 * | 3/2022 | Gao | H04L 27/26136 |
| 11,324,076 B2 * | 5/2022 | Xiong | H04L 27/2613 |
| 11,368,275 B2 * | 6/2022 | Moon | H04W 72/23 |
| 11,464,075 B2 * | 10/2022 | Zhang | H04L 5/0053 |
| 11,672,048 B2 * | 6/2023 | Zhang | H04W 56/001 370/329 |
| 11,764,922 B2 * | 9/2023 | Werner | H04L 25/024 370/329 |
| 2018/0234197 A1 * | 8/2018 | John Wilson | H04L 5/0048 |
| 2019/0052443 A1 * | 2/2019 | Cheng | H04L 5/0023 |
| 2019/0090299 A1 * | 3/2019 | Ang | H04W 52/0229 |
| 2019/0109750 A1 * | 4/2019 | Nam | H04W 52/0216 |
| 2019/0116012 A1 * | 4/2019 | Nam | H04L 5/0053 |
| 2019/0215117 A1 * | 7/2019 | Lee | H04L 5/0048 |
| 2019/0215119 A1 * | 7/2019 | Kim | H04B 7/0695 |
| 2019/0222385 A1 * | 7/2019 | Hessler | H04W 72/1268 |
| 2019/0260466 A1 * | 8/2019 | Bai | H04B 7/2668 |
| 2019/0296956 A1 * | 9/2019 | John Wilson | H04L 25/0224 |
| 2019/0394082 A1 * | 12/2019 | Cirik | H04W 76/28 |
| 2020/0146107 A1 * | 5/2020 | Xiong | H04W 68/005 |
| 2020/0162303 A1 * | 5/2020 | Kim | H04L 5/0082 |
| 2020/0275523 A1 * | 8/2020 | Zhang | H04B 7/0695 |
| 2020/0287678 A1 * | 9/2020 | Li | H04L 27/2613 |
| 2020/0344034 A1 * | 10/2020 | Moon | H04L 5/10 |
| 2020/0351053 A1 * | 11/2020 | Werner | H04L 25/0226 |
| 2020/0382262 A1 * | 12/2020 | Cheng | H04L 5/0023 |
| 2021/0105113 A1 * | 4/2021 | Saito | H04L 5/0051 |
| 2021/0135922 A1 * | 5/2021 | Gao | H04L 5/0051 |
| 2021/0218454 A1 * | 7/2021 | Nam | H04B 7/0626 |
| 2021/0258940 A1 * | 8/2021 | Kim | H04L 5/0051 |
| 2021/0329575 A1 * | 10/2021 | Li | H04W 74/0841 |
| 2021/0359811 A1 * | 11/2021 | Zewail | H04L 5/0051 |
| 2021/0359812 A1 * | 11/2021 | Bai | H04L 5/0091 |
| 2022/0070823 A1 * | 3/2022 | Ma | H04L 27/26025 |
| 2022/0312500 A1 * | 9/2022 | Cao | H04L 1/0003 |
| 2022/0408523 A1 * | 12/2022 | Zhang | H04L 5/0048 |
| 2023/0179276 A1 * | 6/2023 | Petersson | H04B 7/0617 375/262 |
| 2023/0246779 A1 * | 8/2023 | Yuan | H04L 5/0035 370/329 |
| 2023/0300946 A1 * | 9/2023 | Zhang | H04L 5/0048 370/329 |
| 2023/0318769 A1 * | 10/2023 | Wang | H04L 5/0048 370/329 |

FOREIGN PATENT DOCUMENTS

| | | | |
|---|---|---|---|
| EP | 4092925 A1 * | 11/2022 | |
| EP | 4250814 A2 * | 9/2023 | ............ H04L 5/001 |
| WO | WO-2019067925 A1 | 4/2019 | |
| WO | WO-2019195171 A1 | 10/2019 | |
| WO | WO-2022043918 A1 * | 3/2022 | |
| WO | WO-2022162507 A1 * | 8/2022 | |
| WO | WO-2022228117 A1 * | 11/2022 | ............ H04L 27/26 |
| WO | WO-2023175411 A1 * | 9/2023 | |

OTHER PUBLICATIONS

Partial International Search Report—PCT/US2021/041898—ISA/EPO—Oct. 22, 2021 (207068WO).

* cited by examiner

First TRS configuration 410-a

Second TRS configuration 410-b

400

First TRS configuration 710-a

Second TRS configuration 710-b

TECHNIQUES FOR FLEXIBLE REFERENCE SIGNAL PATTERNS IN WIRELESS COMMUNICATIONS SYSTEMS

CROSS REFERENCE

The present Application for Patent claims the benefit of U.S. Provisional Patent Application No. 63/072,010 by MA et al., entitled "TECHNIQUES FOR FLEXIBLE REFERENCE SIGNAL PATTERNS IN WIRELESS COMMUNICATIONS SYSTEMS," filed Aug. 28, 2020, assigned to the assignee hereof, and expressly incorporated by reference herein.

FIELD OF TECHNOLOGY

The following relates to wireless communications, including techniques for flexible reference signal patterns in wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support reference signals, such as tracking reference signals. Such reference signals may enable devices in the wireless communications system to estimate channel conditions, frequency errors, etc. However, conventional techniques for reference signals may be deficient.

SUMMARY

The described techniques relate to improved methods, systems, devices, and apparatuses that support techniques for flexible reference signal patterns in wireless communications systems. Generally, the described techniques enable devices of a wireless communications system to implement one or more tracking reference signal (TRS) configurations, for example, in accordance with one or more indications, which may result in improved accuracy for frequency offset estimation (e.g., in relatively high frequency bands), enhanced flexibility in the system, reduced processing and system overhead, or any combination thereof, among other examples of advantages. For example, a base station may configure a user equipment with a set of TRS configurations (e.g., the base station may transmit a first TRS configuration and a second TRS configuration to the UE). The UE may receive, from the base station, a tracking reference signal in accordance with a selected TRS configuration based on an indicator for selection from among the set of TRS configurations. For example, the UE may select a TRS configuration based on an identified bandwidth part, an indicator received via control signaling, an aperiodic TRS trigger, an indicator received during a random access channel procedure, an identified transmission configuration indicator state, or any combination thereof, among other examples of selecting a TRS configuration based on an indicator.

DETAILED DESCRIPTION

Figure 1:
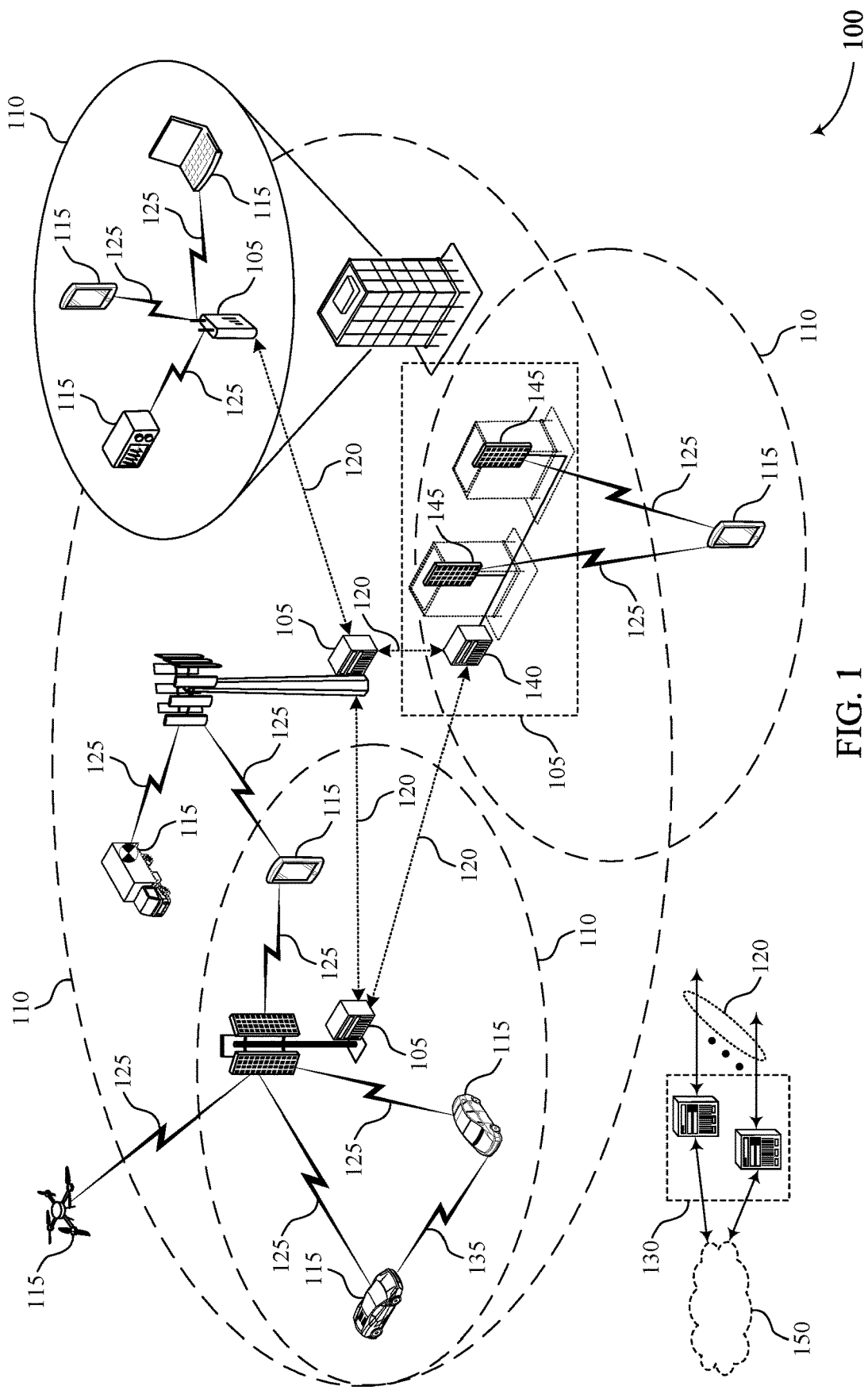
FIG. 1 illustrates an example of a system for wireless communications that supports techniques for flexible reference signal patterns in wireless communications systems in accordance with aspects of the present disclosure.

Some wireless communications systems (e.g., New Radio (NR)) may support reference signals, which may enable a user equipment (UE) and a base station to estimate channel conditions, enhance reliability or efficiency of communications, among other examples. For example, a tracking reference signal (TRS) may be implemented by a user equipment (UE) and a base station for time tracking, frequency tracking, or the like. As an illustrative example, a UE may receive a TRS from a base station and estimate a frequency offset based on the TRS. However, in some cases the UE may experience a relatively high amount of frequency error (e.g., for higher frequency bands, such as FR2x, FR4, etc.), which may reduce an accuracy of frequency offset estimation.

In accordance with the techniques described herein, a UE may be configured with multiple TRS configurations (e.g., multiple TRS patterns in accordance with a respective set of parameters). For example, a base station may configure the multiple TRS configurations at the UE. The described techniques may enable the UE to select from among the multiple TRS configurations (e.g., switch between the multiple TRS configurations). In some examples, a different TRS configuration may be implemented depending on a numerology, an operating signal-to-noise ratio (SNR), a residual error threshold, or a combination thereof, among other examples of parameters, which may result in enhanced accuracy for frequency offset estimation and flexible TRS patterns in the system, among other advantages.

For example, a base station may configure the UE with a first TRS configuration (e.g., a first TRS pattern in accordance with a first set of parameters) and a second TRS configuration (e.g., a second TRS pattern in accordance with a second set of parameters). The UE may identify an indicator for selection from among the TRS configurations. The UE may receive a TRS in accordance with a selected TRS configuration based on the identified indicator. In some examples, the UE may select a TRS configuration based on an identified bandwidth part. For example, a first bandwidth part may correspond to the first TRS configuration and a second bandwidth part may correspond to the second TRS configuration, and the UE may select a respective TRS configuration based on whether the identified bandwidth part is the first bandwidth part or the second bandwidth part. Additionally or alternatively, the base station may transmit an indicator to switch TRS configurations via control signaling (e.g., via radio resource control (RRC) configuration signaling, medium access control (MAC) control element (CE) signaling, downlink control information, etc.). The UE may switch from a first TRS configuration to a second TRS configuration in accordance with the indicator in the control signaling, which may enable the base station to update the UE with different TRS configurations within a same bandwidth part.

In some examples, the base station may configure the UE with a default TRS configuration (e.g., for periodic resources) and may transmit an aperiodic TRS trigger indicating a different TRS configuration (e.g., for aperiodic resources indicated by the TRS trigger). In some examples, the base station may transmit a message indicating a TRS configuration as part of a random access channel (RACH) procedure (e.g., message 2 or message B in a 4 step RACH procedure or a 2 step RACH procedure, respectively). In some examples, the UE may select a TRS configuration based on an identified transmission configuration indicator (TCI) state for different beams (e.g., a TCI state may correspond to a respective TRS configuration). Aspects of the disclosure are initially described in the context of wireless communications systems. Aspects of the disclosure are also described in the context of resource schemes and process flows. Aspects of the disclosure are further illustrated by and described with reference to apparatus diagrams, system diagrams, and flowcharts that relate to techniques for flexible reference signal patterns in wireless communications systems.

FIG. 1 illustrates an example of a wireless communications system 100 that supports techniques for flexible reference signal patterns in wireless communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest SNR, or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The wireless communications system 100 may support reference signals, which may enable a base station 105 or a UE 115 to estimate channel conditions or enhance reliability or efficiency of communications, among other examples. For example, a TRS may be implemented by the UE 115 or the base station 105 for time tracking, frequency tracking, or the like. As an illustrative example, a base station 105 may receive a TRS from a UE 115 and estimate a frequency offset at the UE 115 based on the TRS. However, in some cases the UE 115 may experience a relatively high amount of frequency error (e.g., for higher frequency bands, such as FR2x, FR4, etc.), which may reduce an accuracy of frequency offset estimation.

In accordance with the techniques described herein, a UE 115 may be configured with multiple TRS configurations (e.g., multiple TRS patterns in accordance with respective sets of parameters). For example, a base station 105 may configure the multiple TRS configurations at the UE 115. The described techniques may enable the UE 115 to select from among the multiple TRS configurations (e.g., switch between the multiple TRS configurations). In some examples, a different TRS configuration may be implemented depending on a numerology, an operating SNR, a residual error threshold, or a combination thereof, among other examples of parameters, which may result in enhanced accuracy for frequency offset estimation and flexible TRS patterns in the system, among other advantages.

For example, a base station 105 may configure a UE 115 with a set of TRS configurations (e.g., the base station 105 may transmit a first TRS configuration and a second TRS configuration to the UE 115). The UE 115 may identify an indicator for selection from among the set of TRS configurations. The UE 115 may transmit a tracking reference signal in accordance with a selected TRS configuration based on the identified indicator. For example, the UE 115 may select a TRS configuration based on an identified bandwidth part, an indicator received via control signaling, an aperiodic TRS trigger, an indicator received during a random access channel procedure, an identified transmission configuration indicator state, or any combination thereof, among other examples of selecting a TRS configuration based on an indicator.

Figure 2:
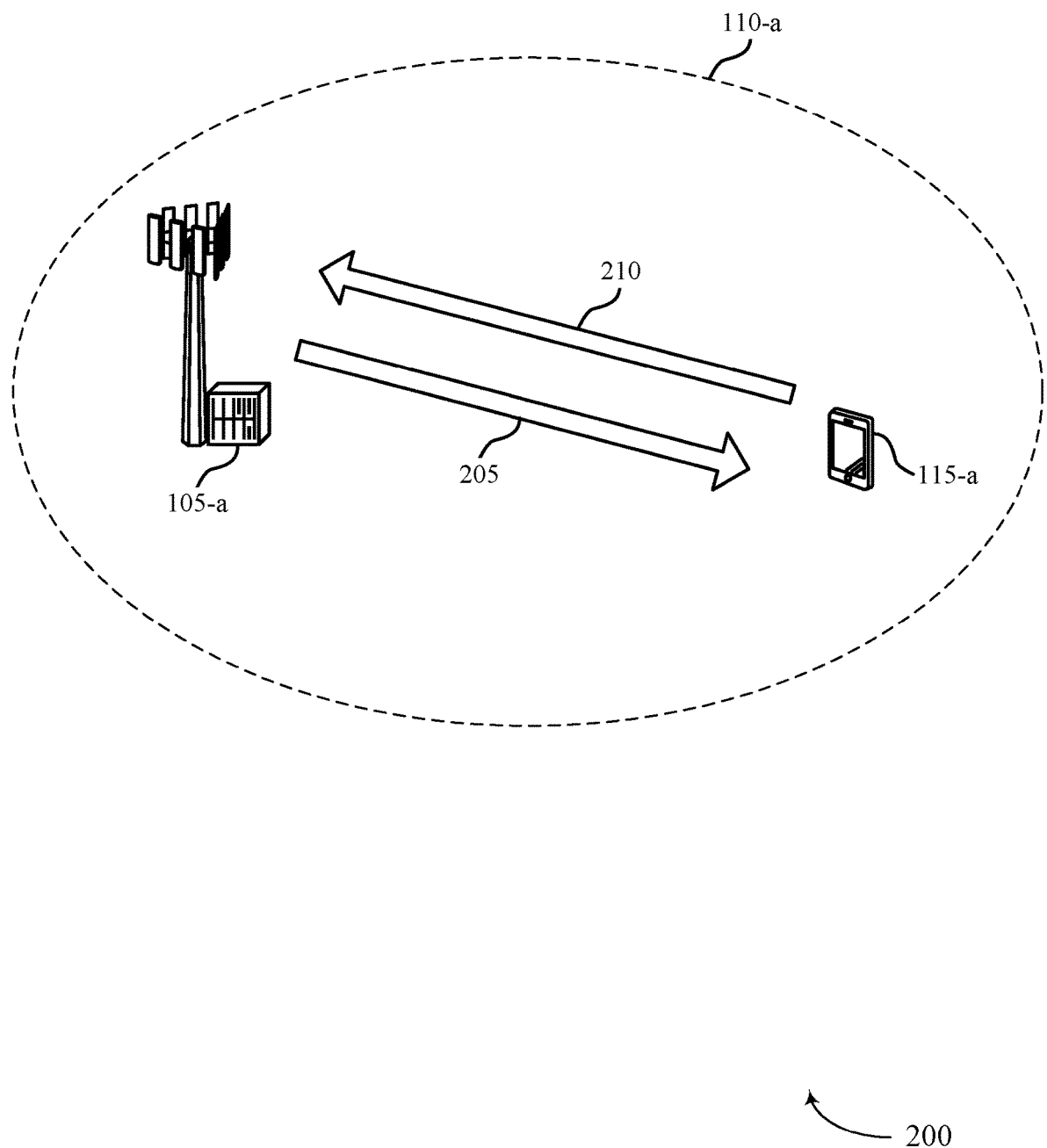
FIG. 2 illustrates an example of a wireless communications system that supports techniques for flexible reference signal patterns in wireless communications systems in accordance with aspects of the present disclosure.

FIG. 2 illustrates an example of a wireless communications system 200 that supports techniques for flexible reference signal patterns in wireless communications systems in accordance with aspects of the present disclosure. In some examples, the wireless communications system 200 may implement aspects of wireless communications system 100. The wireless communications system 200 may include a UE 115-a and a base station 105-a which may be examples of a UE 115 and a base station 105 as described with reference to FIG. 1. The base station 105-a may be associated with a cell which provides wireless communications service with a coverage area 110-a. The base station 105-a may communicate with the UE 115-a using downlink communications 205 or uplink communications 210.

The wireless communications system 200 may support TRSs for estimating frequency offsets in the system. For example, a receiving device (e.g., the base station 105-a or the UE 115-a) may receive a TRS. While referred to in some cases as a base station (e.g., the base station 105) receiving a reference signal (e.g., the TRS), any of the techniques or aspects described herein may additionally or alternatively support a UE (e.g., the UE 115) receiving the reference signal (e.g., the TRS) and estimating frequency offsets. The receiving device may use the TRS to estimate the frequency offset (e.g., to track a phase of a local oscillator at the transmitter and receiver devices). For example, the receiving device may apply a quadri-correlator (e.g., to two TRS symbols or bursts for OFDM or single carrier (SC) waveforms) to estimate the frequency offset (e.g., a frequency error). For instance, a TRS may be transmitted in two bursts covering N total samples (e.g., each burst may include N/2 samples) or resource elements.

The performance of the frequency offset estimation (e.g., in terms of the variance of the estimation error) may be inversely proportional to a received SNR (e.g., a higher SNR may result in a smaller error in the frequency offset estimation), inversely proportional to a total number of TRS resource elements in each symbol or burst, inversely proportional to the square of the gap between the TRS symbols or bursts used for the quadri-correlator, etc. In some cases, the frequency offset estimation performance, in terms of a pull in range (e.g., how large a frequency error that the receiver is capable of estimating and correcting), may be inversely proportional to the gap between the TRS symbols or bursts. For example, a larger gap may reduce error in frequency offset estimation but may also reduce the pull in range. Accordingly, the techniques described herein may enable a network (e.g., the base station 105-a) to configure TRS patterns based on the performance of the frequency offset estimation (e.g., the base station 105-a may balance a tradeoff between patterns resulting in relatively higher accuracy error estimation and lower pull in range or lower accuracy error estimation and higher pull in range).

The wireless communications system 200 may support multiple TRS patterns (e.g., multiple TRS configurations), for example, in relatively high band frequencies. For example, the UE 115-a may be configured with multiple TRS configurations. In some cases, the base station 105-a may configure (e.g., via downlink communications 205) the multiple TRS configurations at the UE 115-a. The described techniques may enable the UE 115-a to select from among the multiple TRS configurations (e.g., switch between the multiple TRS configurations). In other words, a different TRS configuration may be implemented depending on a numerology, an operating SNR, a target frequency error threshold, or a combination thereof, among other examples of parameters, which may result in enhanced accuracy for frequency offset estimation, flexible TRS patterns in the system (e.g., various TRS configurations may be configured and implemented based on various parameters to improve a pull in range or error estimation), among other advantages.

In some examples, when a synchronization signal block (SSB) uses a relatively smaller sub carrier spacing (SCS) than a respective channel (e.g., control channel or shared channel), the starting frequency error at a connected state may be lower, which may enable the UE 115-*a* or the base station 105-*a* to implement a TRS pattern with a lower pull in range. Such an implementation may result in a pattern with a relatively smaller variance of estimation error (e.g., relatively more accurate frequency error detection or correction). For example, the UE 115-*a* may use one or more of the techniques described herein to select a TRS configuration with a set of parameters resulting in a TRS pattern with the lower pull in range (e.g., the base station 105-*a* may indicate the selected TRS configuration, the UE 115-*a* may switch to a bandwidth part or TCI state corresponding to the selected TRS configuration, etc.).

In some examples, the wireless communications system 200 may support demodulation reference signal (DMRS) bundling. In such examples, the base station 105-*a* may configure a TRS pattern that results in a relatively lower frequency offset estimation error. For example, a receiving device may estimate the channel conditions using the DMRSs across multiple slots (e.g., the receiving device may combine DMRSs across the multiple slots) which may use a relatively high coherence (e.g., a relatively lower residual frequency offset). Such estimation may be obtained by the base station 105-*a* allocating relatively more TRS resource elements for each TRS symbol or burst during slots that the DMRS bundling is enabled. Additionally or alternatively, the base station 105-*a* may increase the gap between TRS symbols or bursts to reduce the error (e.g., the base station 105-*a* may increase the gap such that a pull in range threshold is satisfied). In some examples, the UE 115-*a* may be at a higher geometry or SNR operating point. In such examples, the base station 105-*a* may configure relatively fewer TRS resource elements, which may result in reduced system overhead, among other advantages. Although the techniques described herein are discussed with reference to TRSs, it is to be understood that the techniques described herein may be applicable for any reference signal.

The base station 105-*a* may configure the UE 115-*a* with at least a first TRS configuration (e.g., a first TRS pattern in accordance with a first set of parameters) and a second TRS configuration (e.g., a second TRS pattern in accordance with a second set of parameters). The UE 115-*a* may identify an indicator for selection from among the TRS configurations. The UE 115-*a* may receive a TRS in accordance with a selected TRS configuration based on the identified indicator. In some examples, the UE 115-*a* may select a TRS configuration based on an identified bandwidth part. For example, a first bandwidth part may correspond to the first TRS configuration and a second bandwidth part may correspond to the second TRS configuration, and the UE 115-*a* may select a respective TRS configuration based on whether the identified bandwidth part is the first bandwidth part or the second bandwidth part. In other words, the UE 115-*a* may transmit a TRS using a first configuration on a first BWP and a second configuration on a second BWP. Additionally or alternatively, the base station 105-*a* may transmit an indicator to switch TRS configurations via control signaling (e.g., via RRC configuration signaling, MAC-CE signaling, downlink control information (DCI), etc.). The UE 115-*a* may switch from a first TRS configuration to a second TRS configuration in accordance with the indicator in the control signaling, which may enable the base station to update the UE 115-*a* with different TRS configurations within a same bandwidth part.

In some examples, the base station 105-*a* may configure the UE 115-*a* with a default TRS configuration (e.g., for periodic resources) and may transmit an aperiodic TRS trigger indicating a different TRS configuration (e.g., for aperiodic resources indicated by the TRS trigger). In some examples, the base station 105-*a* may transmit a message indicating a TRS configuration as part of a RACH procedure (e.g., message 2 or message B in a 4 step RACH procedure or a 2 step RACH procedure, respectively). In some examples, the UE 115-*a* may select a TRS configuration based on an identified TCI state (e.g., different beams may correspond to different TCI states). For example, the UE 115-*a* may select a TRS configuration that corresponds to the identified TCI state.

In some examples, a reference signal may be transmitted in uplink communications 210. The reference signal may be transmitted with other uplink signaling such as data signaling, control signaling, or other reference signals. For example, the base station 105-*a* may schedule the UE 115-*a* for a transmission via uplink communications 210, and the transmission may include the reference signal and may include other signaling. In some examples, the transmission may include other reference signals, which may also be configured according to one or more configurations. For example, the transmission may include a DMRS or a sounding reference signal (SRS), which each may be configured according to independent configurations. Additionally or alternatively, the reference signal may be included in downlink communications 205. For example, a TRS may be transmitted via downlink communications 205 as described herein (e.g., with other downlink signaling such as data signaling, control signaling, other reference signals, and the like).

Figure 3:
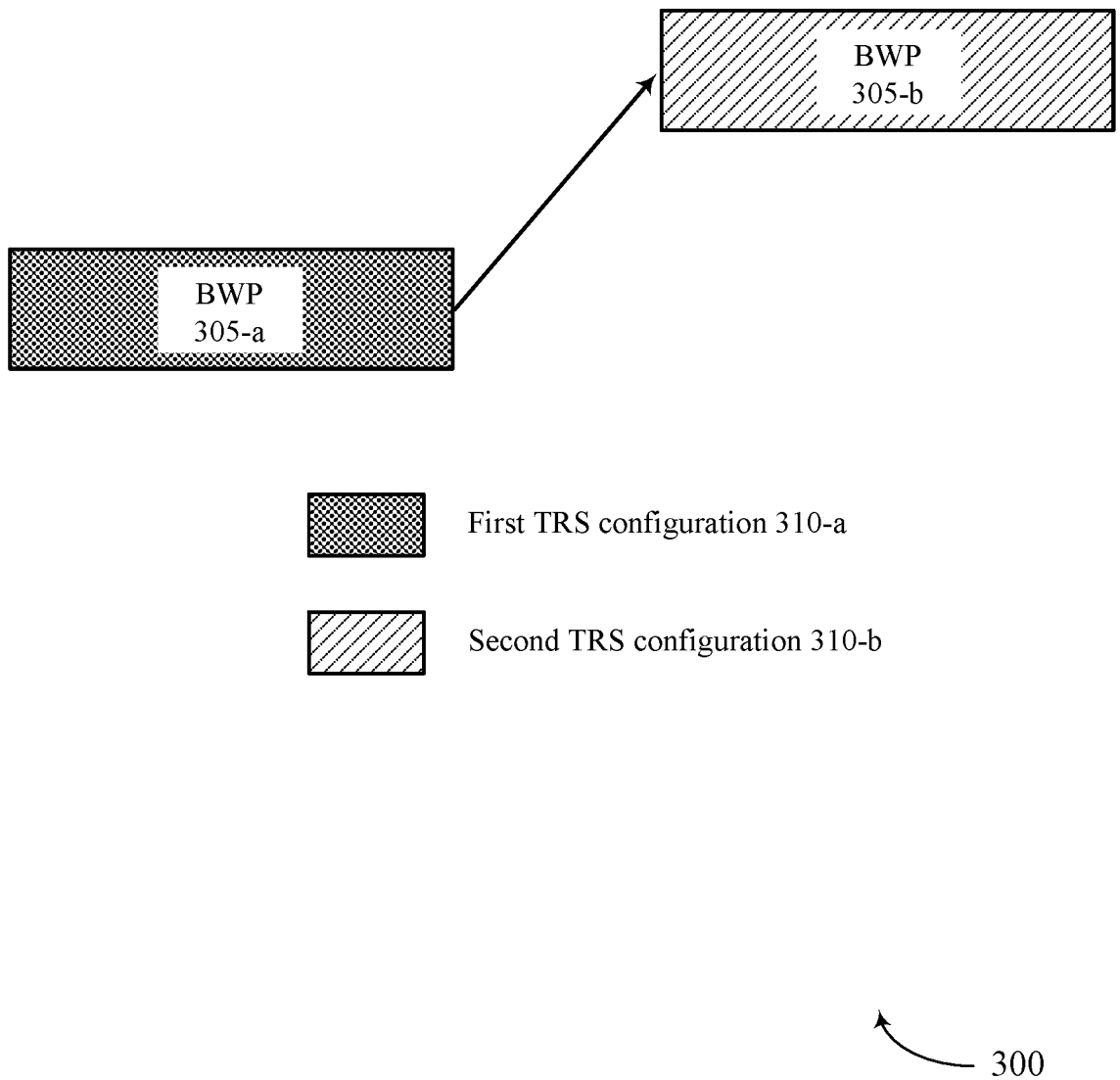
FIGS. 3-5 illustrate examples of resource schemes that support techniques for flexible reference signal patterns in wireless communications systems in accordance with aspects of the present disclosure.

FIG. 3 illustrates an example of a resource scheme 300 that supports techniques for flexible reference signal patterns in wireless communications systems in accordance with aspects of the present disclosure. In some examples, the resource scheme 300 may implement aspects of wireless communications system 100 or 200. For example, the resource scheme 300 may illustrate communications between a base station 105 and a UE 115 as described herein. Generally, the resource scheme 300 may show an example of implementing different TRS configurations (e.g., TRS patterns) for different bandwidth parts (BWPs), such as the BWP 305-*a* and the BWP 305-*b*, respectively.

A UE may communicate with a base station via BWP 305-*a* having a first frequency range. For example, the UE may transmit signals (e.g., uplink data, control, or reference signals) using time frequency resources (e.g., resource elements) of the BWP 305-*a* over a first set of time resources. The UE may receive a TRS in accordance with a first TRS configuration 310-*a* that corresponds to the BWP 305-*a* during the first set of time resources. For example, the UE may be configured (e.g., by the base station) such that the first BWP 305-*a* is associated with (e.g., tied to) the first TRS configuration 310-*a* and a second BWP 305-*b* is associated with a second TRS configuration 310-*b*. The UE may identify the BWP 305-*a* for communicating a first TRS and may select the first TRS configuration 310-*a* based on the configured correspondence between the BWP 305-*a* and the first TRS configuration 310-*a*. Thus, different TRS patterns may be configured, for example, depending on the numerology configured for a given BWP 305. In some examples, TRS configurations 310 that result in a relatively low error for frequency offset estimation may be configured with BWPs 305 that utilize a relatively high frequency band, among other examples.

The first TRS configuration 310-*a* may include a first set of parameters for transmitting the TRS via the BWP 305-*a*. For example, the first set of parameters may include a length of a TRS burst in a quantity of slots, a TRS burst periodicity in the quantity of slots, a quantity of symbols for the TRS within a slot, a TRS bandwidth (e.g., the first set of parameters may indicate the BWP 305-*a*), a TRS subcarrier spacing, or a TRS symbol spacing within the slot, among other examples of parameters. The second TRS configuration 310-*b* may include a second set of parameters for transmitting the TRS via the BWP 305-*b*. For example, the second set of parameters may include a length of a TRS burst in a quantity of slots, a TRS burst periodicity in the quantity of slots, a quantity of symbols for the TRS within a slot, a TRS bandwidth (e.g., the second set of parameters may indicate the BWP 305-*b*), a TRS subcarrier spacing, or a TRS symbol spacing within the slot, among other examples of parameters.

The UE may identify the second BWP 305-*b* having a second frequency range. For example, the UE may switch from the BWP 305-*a* to the BWP 305-*b* for a second set of time resources. In some cases, the UE may switch BWPs 305 based on receiving DCI from the base station indicating that the UE is to switch to the BWP 305-*b* for communications. Additionally or alternatively, the UE may be configured with a timer. The UE may switch to the BWP 305-*b* based on an expiration of the timer.

The UE may select the second TRS configuration 310-*b* from among a set of TRS configurations 310 based on the identified BWP 305-*b*. For example, the BWP 305-*b* may be associated with the second TRS configuration 310-*b* (e.g., the BWP configuration for the BWP 305-*b* may correspond or be associated with the TRS configuration 310-*b*). In some cases, the UE may identify an indicator for selecting the TRS configuration 310-*b*, where the indicator includes the identified BWP 305-*b* (e.g., the BWP configuration for the BWP 305-*b*). The UE may receive a TRS in accordance with the second TRS configuration 310-*b* (e.g., using a second TRS pattern based on the second set of parameters). In some cases, such techniques may enable the UE to automatically apply a different TRS pattern when switching from a first BWP 305 to a second BWP 305.

Figure 4:
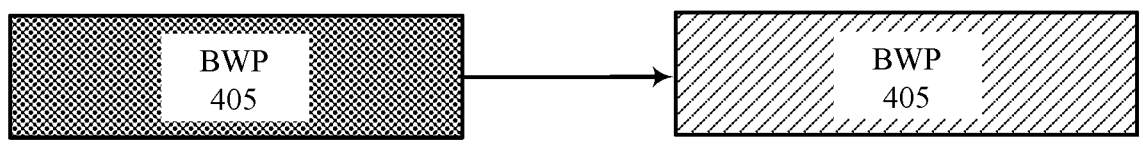
Figure 4:
Figure 4:
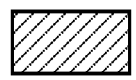

FIG. 4 illustrates an example of a resource scheme 400 that supports techniques for flexible reference signal patterns in wireless communications systems in accordance with aspects of the present disclosure. In some examples, the resource scheme 400 may implement aspects of wireless communications system 100 or 200. For example, the resource scheme 400 may illustrate communications between a base station 105 and a UE 115 as described herein. Generally, the resource scheme 400 may show an example of implementing different TRS configurations based on control signaling from a base station (e.g., different TRS patterns for a same BWP, such as the BWP 405).

A UE may communicate with a base station via a BWP 405. For example, the UE may transmit and receive signals (e.g., data signals, control signals, reference signals) using time frequency resources (e.g., resource elements) of the BWP 405. The UE may receive a TRS in accordance with a first TRS configuration 410-*a* during a first set of time resources. In some examples, the base station may send control signaling to the UE including an indicator for selection from among multiple TRS configurations. For example, the base station may configure the UE to use the first TRS configuration 410-*a* for the first set of time resources via RRC signaling (e.g., RRC configuration of the first TRS configuration 410-*a*), MAC-CE signaling (e.g., a field in a MAC-CE may indicate the first TRS configuration 410-*a*), DCI, or any combination thereof. In some examples, such control signaling may additionally or alternatively configure the UE with the set of multiple TRS configurations (e.g., the base station may transmit the first TRS configuration and the second TRS configuration to the UE prior to transmitting an indicator for selection of one or both of the TRS configurations). As an illustrative example, the UE may communicate a first TRS using the first TRS configuration 410-*a* via the BWP 405 at a first time. The first TRS configuration 410-*a* may include a first set of parameters for transmitting the TRS via the BWP 405. For example, the first set of parameters may include a length of a TRS burst in a quantity of slots, a TRS burst periodicity in the quantity of slots, a quantity of symbols for the TRS within a slot, a TRS bandwidth (e.g., the first set of parameters may indicate the BWP 405), a TRS subcarrier spacing, or a TRS symbol spacing within the slot, among other examples of parameters.

The UE may receive, subsequent to receiving the first TRS and prior to receiving a second TRS, control signaling including an indicator for selection among a set of TRS configurations 410. For example, the UE may receive the control signaling indicating the second TRS configuration 410-*b* for a second set of time resources. The second TRS configuration 410-*b* may include a second set of parameters for transmitting the TRS via the BWP 405. For example, the second set of parameters may include a length of a TRS burst in a quantity of slots, a TRS burst periodicity in the quantity of slots, a quantity of symbols for the TRS within a slot, a TRS bandwidth (e.g., the second set of parameters may indicate the BWP 405), a TRS subcarrier spacing, or a TRS symbol spacing within the slot, among other examples of parameters. The UE may receive the second TRS in accordance with the second TRS configuration 410-*b* based on identifying the indicator for selection that indicates the second TRS configuration 410-*b* (e.g., in accordance with the control signaling). Such techniques may enable the base station to update the UE with a TRS pattern for a same BWP 405, which may enhance flexibility in the communications system, among other advantages.

Figure 5:
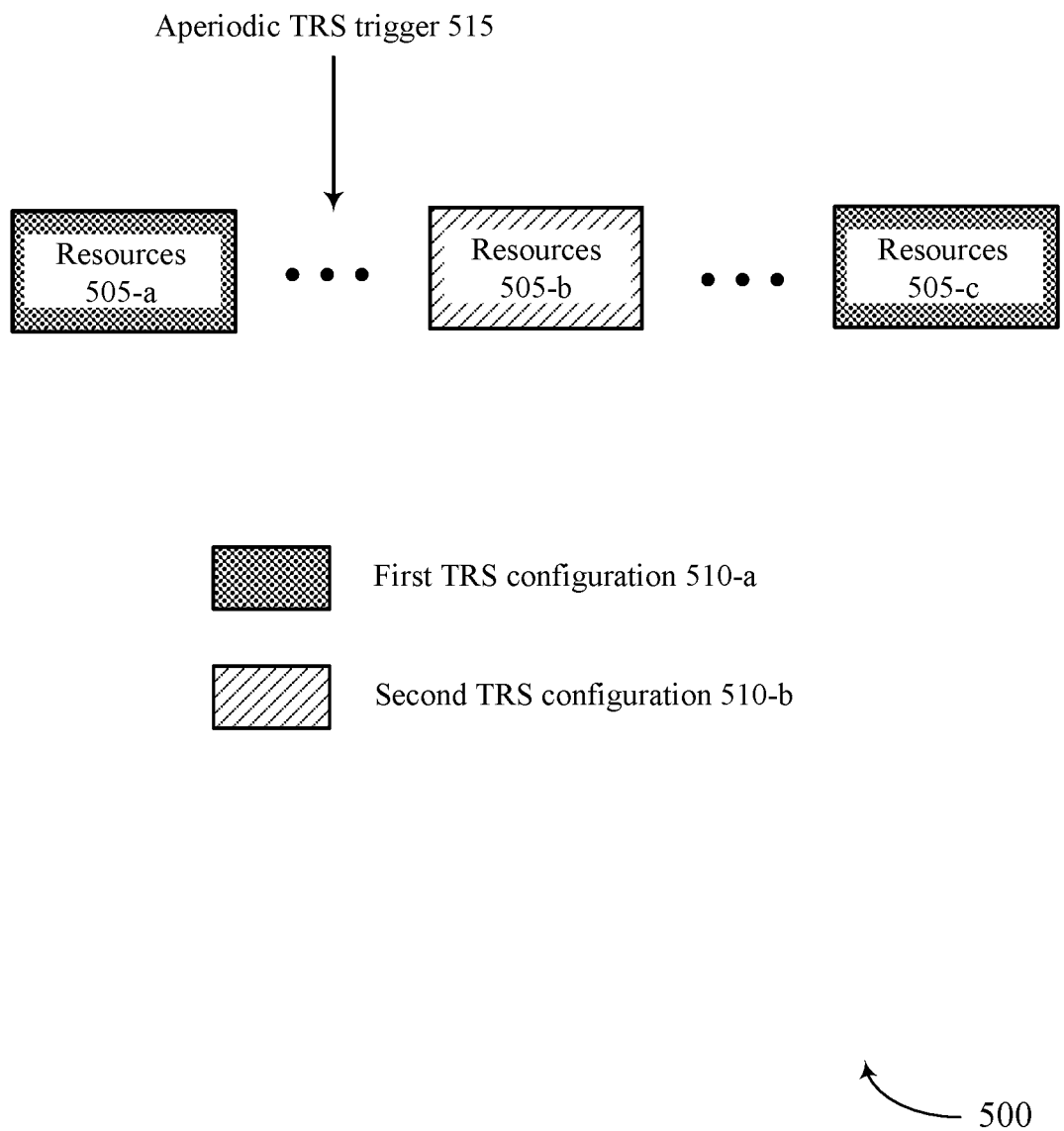

FIG. 5 illustrates an example of a resource scheme 500 that supports techniques for flexible reference signal patterns in wireless communications systems in accordance with aspects of the present disclosure. In some examples, the resource scheme 500 may implement aspects of wireless communications system 100 or 200. For example, the resource scheme 500 may illustrate communications between a base station 105 and a UE 115 as described herein. Generally, the resource scheme 500 may show an example of implementing different TRS configurations for periodic communications and/or aperiodic communications.

A UE may communicate with a base station via the resources 505. For example, the UE may receive a TRS using time frequency resources (e.g., resource elements) of the resources 505-*a* at a first time, which may be an example of a BWP as described herein. In some examples, the base station may configure the UE with a set of TRS configurations 510. For example, the base station may transmit (e.g., via control signaling) the first TRS configuration 510-*a* and the second TRS configuration 510-*b*, although any quantity of TRS configurations 510 may be configured at the UE.

The UE may receive a first TRS in accordance with a first TRS configuration 510-*a*. In some examples, the UE may identify an indicator for selection among the set of TRS configurations 510-*a*. For example, the UE may be scheduled with periodic resources 505-*a* and 505-*c*. The UE may identify the indicator based on identifying the periodic resources 505-*a* and 505-*c*. For example, the UE may use a first TRS configuration 510-*a* (e.g., a periodic TRS configuration 510) based on the identified periodic resources 505-*a* and 505-*c*. In other words, the UE may apply the first TRS configuration 510-*a* (e.g., a first set of parameters resulting in a first TRS pattern) to periodic resources 505, where the indicator for selection includes the indication of periodic resources 505-*a* and 505-*c*. The base station may trigger aperiodic TRS configuration 510-*b* (e.g., dynamically). For example, the base station may send an aperiodic message to the UE indicating aperiodic resources 505-*b* (e.g., for relatively high priority communications, among other examples of scheduling). In some examples, the base station may send the aperiodic message via DCI, RRC signaling, etc. The UE may receive the message including an indicator for selection among various TRS configurations 510. For example, the UE may receive a TRS in accordance with a second TRS configuration 510-*b* based on the aperiodic message indicating the second TRS configuration 510-*b*. In some examples, such triggering by the network to apply an aperiodic TRS pattern may depend on a target threshold (e.g., the base station may determine a slot or number of slots for an aperiodic TRS transmission using a TRS pattern with improved error estimation capabilities, in addition to periodically scheduled TRS transmissions via the periodic resources 505 that use a different TRS pattern). In some examples, an aperiodic TRS trigger 515 (e.g., the indicator included in the aperiodic message) may not change the underlying periodic TRS configuration 510-*a*. In some other examples, the aperiodic TRS trigger 515 may also change subsequent periodic resources 505 to transmit TRSs in accordance with the second TRS configuration 510-*b* (e.g., using a second set of parameters for a second TRS pattern).

Figure 6:
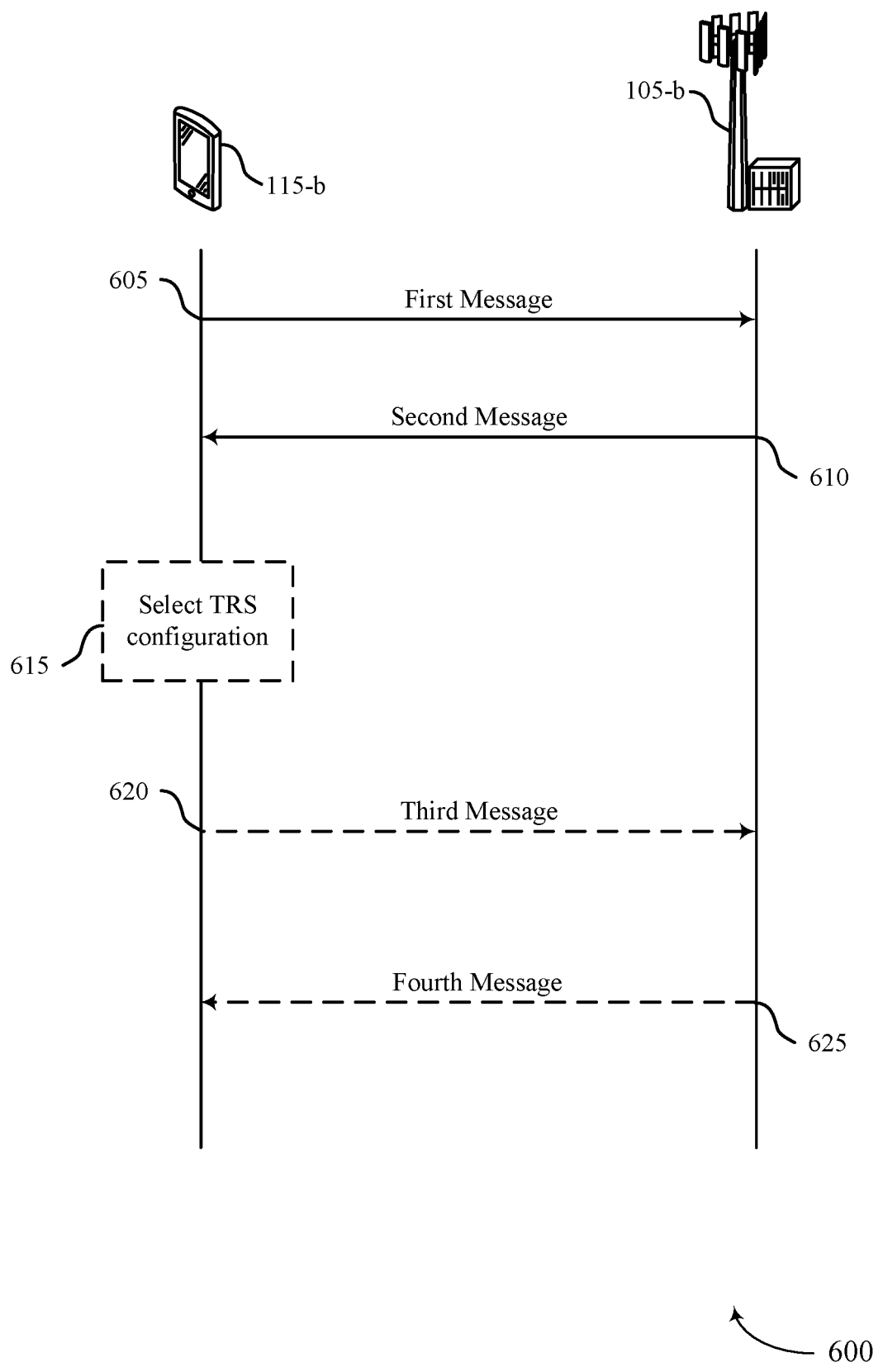
FIG. 6 illustrates an example of a process flow that supports techniques for flexible reference signal patterns in wireless communications systems in accordance with aspects of the present disclosure.

FIG. 6 illustrates an example of a process flow 600 that supports techniques for flexible reference signal patterns in wireless communications systems in accordance with aspects of the present disclosure. In some examples, the process flow 600 may implement aspects of wireless communications system 100 or 200. For example, the process flow 600 may illustrate communications between a base station 105-*b* and a UE 115-*b*, which may be examples of the corresponding devices as described herein. Generally, the process flow 600 may show an example of implementing TRS patterns as part of a RACH procedure.

Alternative examples of the following may be implemented where some processes are performed in a different order than described or not performed at all. In some implementations, processes may include additional features not mentioned below, or further processes may be added.

At 605, the UE 115-*b* may transmit a first message to the base station 105-*b*. The first message may be an example of an initial message of a RACH procedure. For example, the first message may be referred to as msg1 in a 4 step RACH procedure or msgA in a 2 step RACH procedure, among other examples. The first message may include a preamble with information associated with the UE 115-*b*.

At 610, the base station 105-*b* may transmit a second message to the UE 115-*b* in response to receiving the first message. The second message may be a second message of a RACH procedure. For example, the second message may be referred to as msg2 in a 4 step RACH procedure or msgB in a 2 step RACH procedure, among other examples. The second message may include an indicator for selection among one or more TRS configurations. For example, the base station 105-*b* may select a TRS configuration (e.g., a TRS configuration including a respective set of parameters) to trigger for the UE 115-*b* or a set of UEs 115. The base station 105-*b* may select the TRS configuration based on one or more parameters as described herein (e.g., the base station 105-*b* may select a TRS pattern to improve frequency error estimation accuracy based on a frequency, such as high frequency bands, among other examples of parameters such as SNR measurements, residual error thresholds, numerologies, etc.).

The base station 105-*b* may trigger the selected TRS configuration via the second message. For example, the second message may include an indicator for selection among a set of TRS configurations configured at the UE 115-*b*, for example, via remaining minimum system information (RMSI). At 615, the UE 115-*b* may receive the second message and select the TRS configuration based on identifying the indicator included in the second message. In some cases, the TRS configuration (e.g., the TRS pattern indicated by a set of parameters of the TRS configuration) or the trigger to apply the TRS configuration may be sent on DCI of the second message or in a physical downlink shared channel (PDSCH) payload of the second message. In some examples, the base station 105-*b* may choose to trigger a TRS pattern that is selected for a respective detected preamble or detected UE 115 (e.g., the base station 105-*b* may select a TRS pattern for the UE 115-*b* and indicate the TRS pattern). For example, the base station 105-*b* may detect a frequency error for a given preamble (e.g., a given UE 115) and the base station 105-*b* may select different TRS patterns to trigger or refrain from triggering a different TRS pattern based on the detected frequency error. In some examples, the base station 105-*b* may trigger a TRS configuration via DCI of the second message. In some such examples, the base station 105-*b* may choose to trigger a same TRS configuration for multiple preamble (e.g., UEs 115) listed in the second message.

In some examples, at 620 the UE 115-*b* may transmit a third message to the base station 105-*b* in response to receiving the second message. Additionally or alternatively, the UE 115-*b* may receive communications including a TRS in accordance with the selected TRS configuration (e.g., during the fourth message at 625 or during different communications). In some cases, the third message may be a message of a RACH procedure (e.g., msg3 of a 4 step RACH procedure). In some examples, at 625, the base station 105-*b* may transmit a fourth message, for example, msg4 of a 4 step RACH procedure.

Figure 7:
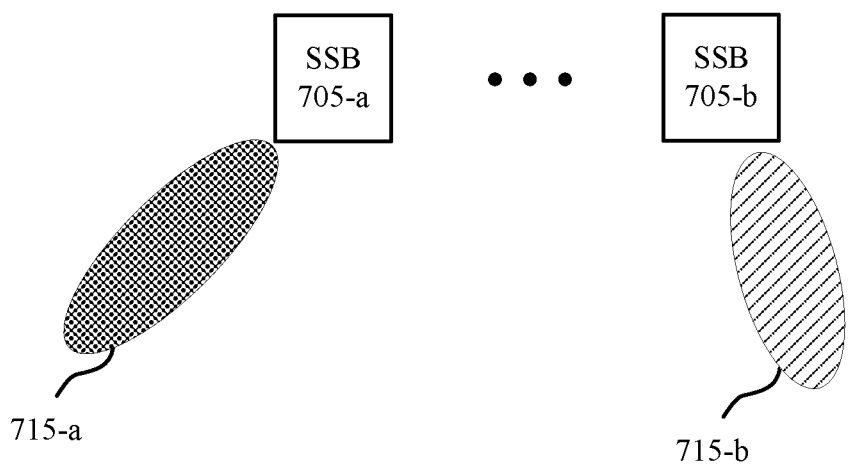
FIG. 7 illustrates an example of a resource scheme that supports techniques for flexible reference signal patterns in wireless communications systems in accordance with aspects of the present disclosure.
Figure 7:
Figure 7:
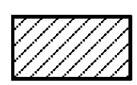

FIG. 7 illustrates an example of a resource scheme 700 that supports techniques for flexible reference signal patterns in wireless communications systems in accordance with aspects of the present disclosure. In some examples, the resource scheme 700 may implement aspects of wireless communications system 100 or 200. For example, the resource scheme 700 may illustrate communications between a base station 105 and a UE 115 as described herein. Generally, the resource scheme 700 may show an example of implementing different TRS configurations 710 for different TCI states (e.g., for different beams 715).

The UE may use different beams 715 to communicate with the base station. For example, the UE may transmit or receive communications via beam 715-*a* or beam 715-*b*. In some examples, the beams 715 may each be associated with a respective TCI state. For example, some TCI states may correspond to wider beams (e.g., with lower beamforming gain) while other TCI states may correspond to more narrow beams (e.g., with better beamforming gain). In accordance with the techniques described herein, each TCI state may correspond to a respective TRS configuration 710. For example, different TRS patterns may be tied to different TCI states (e.g., the TCI state for the beam 715-a may correspond to the first TRS configuration 710-a and the TCI state for the beam 715-b may correspond to the second TRS configuration 710-b).

In some examples, the base station may configure the TRS configurations 710 as described herein. For example, the base station may configure the first TRS configuration 710-a for the TRS communicated via the beam 715-a that is quasi co-located with SSB 705-a. The base station may, additionally or alternatively, configure the second TRS configuration 710-b for the TRS communicated via the beam 715-b that is quasi co-located with SSB 705-b. In other words, the TRS communicated via the beam 715-a may be communicated in accordance with a different pattern than the TRS communicated via the beam 715-b.

Figure 8:
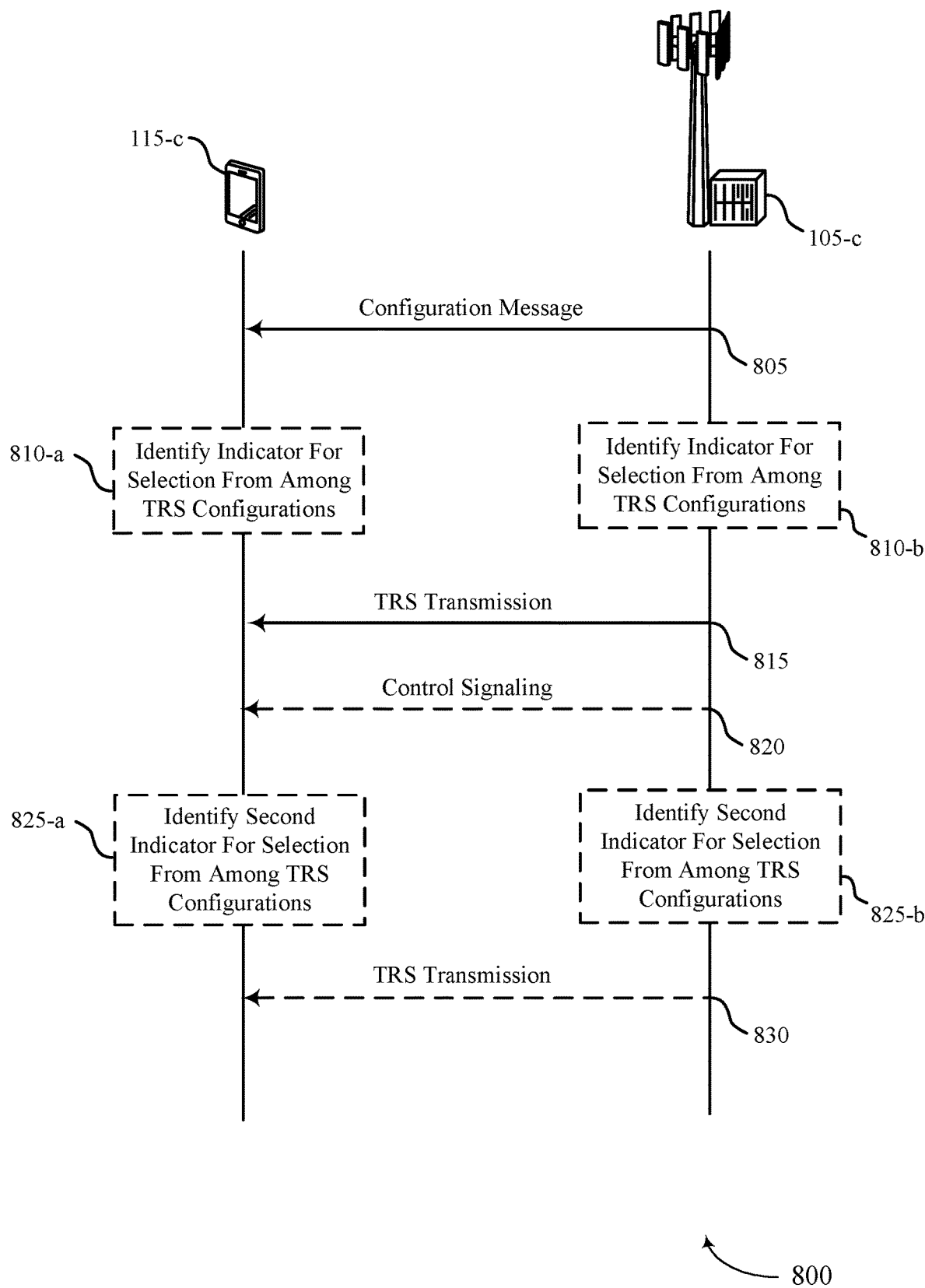
FIG. 8 illustrates an example of a process flow that supports techniques for flexible reference signal patterns in wireless communications systems in accordance with aspects of the present disclosure.

FIG. 8 illustrates an example of a process flow 800 that supports techniques for flexible reference signal patterns in wireless communications systems in accordance with aspects of the present disclosure. In some examples, the process flow 800 may implement aspects of wireless communications system 100 or 200. For example, the process flow 800 may illustrate communications between a base station 105-c and a UE 115-c, which may be examples of the corresponding devices as described herein. Alternative examples of the following may be implemented where some processes are performed in a different order than described or not performed at all. In some implementations, processes may include additional features not mentioned below, or further processes may be added.

At 805, the base station 105-c may transmit a configuration message to the UE 115-c. For example, the base station 105-c may configure the UE 115-c with a set of TRS configurations using the configuration message, the base station 105-c may include an indicator for selection of a TRS configuration from the set of TRS configurations, or both.

In some examples, at 810-a the UE 115-c may identify an indicator for selection from among a set of TRS configurations. For example, the UE 115-c may be configured with a TRS configuration as described herein (e.g., the UE 115-c may be configured with a TRS configuration via a second message of a RACH procedure, the UE 115-c may be configured with a default periodic TRS configuration, control signaling may indicate the TRS configuration, etc.). In some examples, identifying the indicator may include identifying a BWP or receiving control signaling, among other examples as described with reference to FIGS. 1-7.

In some examples, at 810-b the base station 105-c may additionally or alternatively identify the indicator. Although illustrated as occurring after the transmission of the configuration message 805, the base station 105-c may, in some examples, identify the indicator for selection from among the TRS configurations prior to transmitting the configuration message (e.g., if the configuration message includes the indicator).

At 815, the UE 115-c may receive a TRS from the base station 105-c. For example, the base station 105-c may transmit the TRS, and the UE 115-c may receive the TRS, in accordance with a TRS configuration. For example, the TRS transmission may be sent with a TRS pattern based on a set of parameters included in the TRS configuration. In some examples, the TRS configuration is selected based on the identified indicator, the configuration message, or both.

In some examples, the UE 115-c and/or the base station 105-c may determine to switch TRS configurations. For example, the base station 105-c may determine to use a different TRS pattern based on a previously received TRS transmission, the UE 115-c may switch BWPs as described herein, etc.

In some examples, at 820 the base station 105-c may transmit control signaling including an indicator of a second TRS configuration for transmitting a subsequent TRS. The control signaling may be an example of RRC signaling, MAC-CE signaling, or DCI signaling, among other examples.

In some examples, at 825-a the UE 115-c may identify a second indicator for selection from among the TRS configurations. For example, the UE 115-c may determine to switch to a second TRS configuration for a subsequent TRS transmission based on control signaling from the base station 105-c, a switch in BWPs or TCI states, among other examples. Additionally or alternatively, at 825-b the base station 105-c may identify the second indicator.

At 830, the UE 115-c may receive a second TRS transmission from the base station 105-c. The UE 115-c may receive the second TRS transmission in accordance with a second TRS configuration (e.g., a second TRS pattern) selected based on the identified second indicator, which may be an example of an indicator as described herein with reference to FIGS. 1-7.

Figure 9:
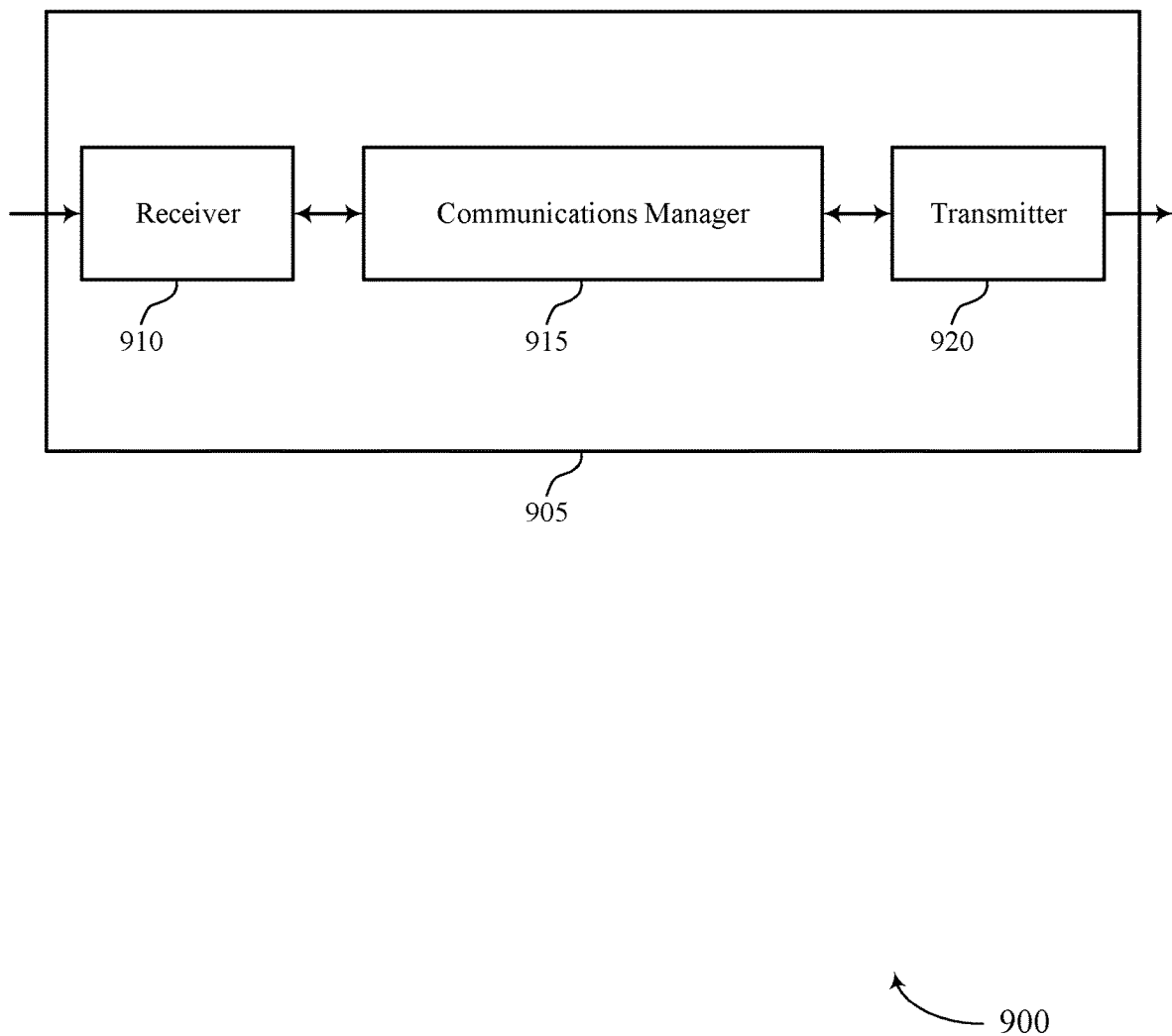
FIGS. 9 and 10 show block diagrams of devices that support techniques for flexible reference signal patterns in wireless communications systems in accordance with aspects of the present disclosure.

FIG. 9 shows a block diagram 900 of a device 905 that supports techniques for flexible reference signal patterns in wireless communications systems in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to techniques for flexible reference signal patterns in wireless communications systems, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a base station, a first tracking reference signal configuration and a second tracking reference signal configuration, the first tracking reference signal configuration including a first set of parameters and the second tracking reference signal configuration including a second set of parameters, and receive, from the base station and based on an indicator for selection from among the first tracking reference signal configuration and the second tracking reference signal configuration, a tracking reference signal in accordance with the first tracking reference signal configuration or the second tracking reference signal configuration. The communications manager 915 may also transmit, to a base station, a first message of a random access channel procedure, receive, from the base station, a second message of the random access channel procedure in response to transmitting the first message, the second message including an indicator for triggering a tracking reference signal transmission, and receive, from the base station, a tracking reference signal in accordance with a tracking reference signal configuration indicated by the indicator of the second message. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 915 may be implemented to realize one or more potential advantages. Some implementations may allow the device 905 to implement flexible TRS configurations (e.g., different TRS patterns). Based on implementing different TRS configurations as described herein, the system may realize improved accuracy for frequency offset estimation or reduced processing overhead, among other benefits.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
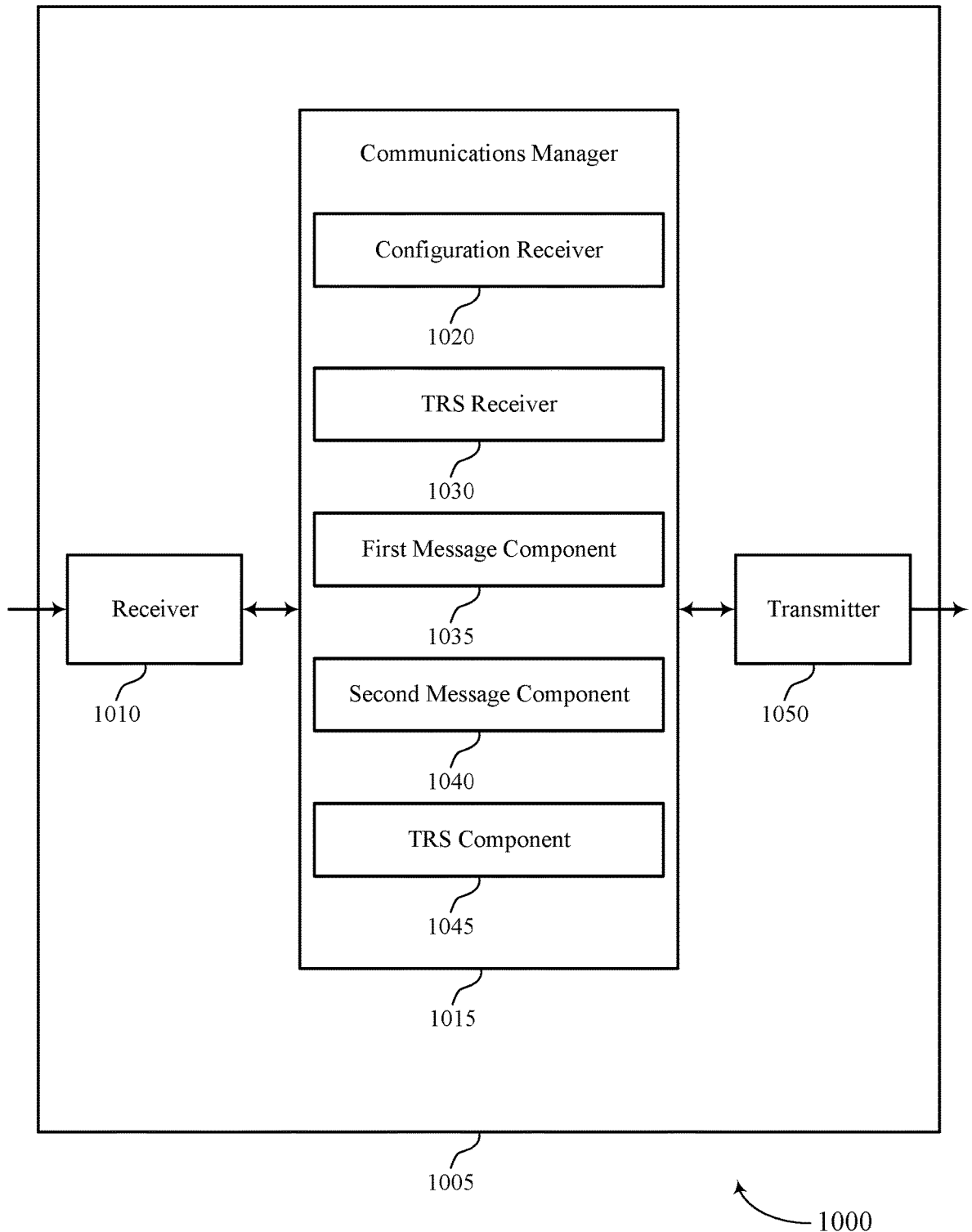

FIG. 10 shows a block diagram 1000 of a device 1005 that supports techniques for flexible reference signal patterns in wireless communications systems in accordance with aspects of the present disclosure. The device 1005 may be an example of aspects of a device 905, or a UE 115 as described herein. The device 1005 may include a receiver 1010, a communications manager 1015, and a transmitter 1050. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for flexible reference signal patterns in wireless communications systems, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a configuration receiver 1020, a TRS receiver 1030, a first message component 1035, a second message component 1040, and a TRS component 1045. The communications manager 1015 may be an example of aspects of the communications manager 1210 described herein.

The configuration receiver 1020 may receive, from a base station, a first tracking reference signal configuration and a second tracking reference signal configuration, the first tracking reference signal configuration including a first set of parameters and the second tracking reference signal configuration including a second set of parameters.

The TRS receiver 1030 may receive, from the base station and based on an indicator for selection from among the first tracking reference signal configuration and the second tracking reference signal configuration, a tracking reference signal in accordance with the first tracking reference signal configuration or the second tracking reference signal configuration.

The first message component 1035 may transmit, to a base station, a first message of a random access channel procedure.

The second message component 1040 may receive, from the base station, a second message of the random access channel procedure in response to transmitting the first message, the second message including an indicator for triggering a tracking reference signal transmission.

The TRS component 1045 may receive, from the base station, a tracking reference signal in accordance with a tracking reference signal configuration indicated by the indicator of the second message.

The transmitter 1050 may transmit signals generated by other components of the device 1005. In some examples, the transmitter 1050 may be collocated with a receiver 1010 in a transceiver module. For example, the transmitter 1050 may be an example of aspects of the transceiver 1220 described with reference to FIG. 12. The transmitter 1050 may utilize a single antenna or a set of antennas.

Figure 11:
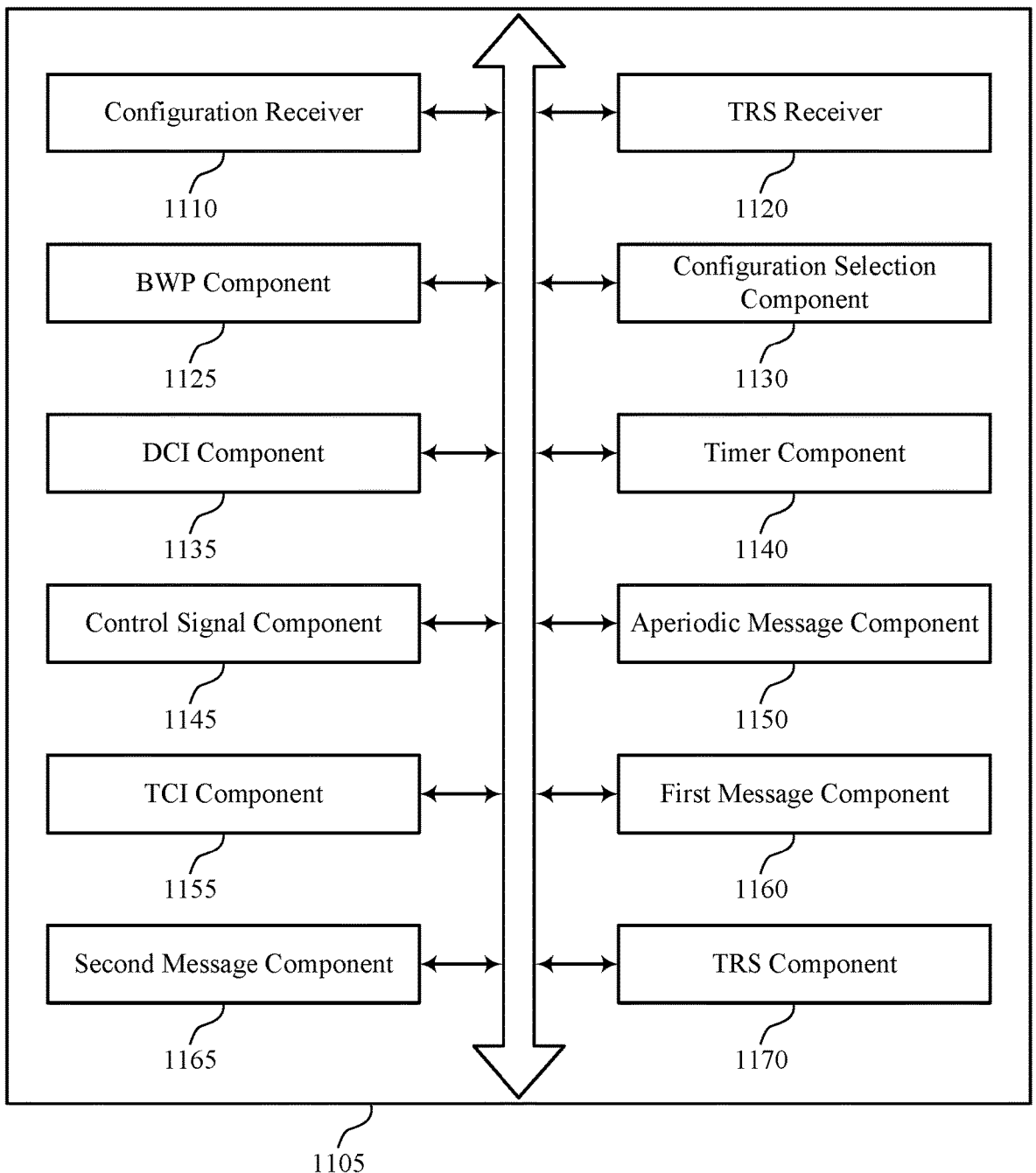
FIG. 11 shows a block diagram of a communications manager that supports techniques for flexible reference signal patterns in wireless communications systems in accordance with aspects of the present disclosure.

FIG. 11 shows a block diagram 1100 of a communications manager 1105 that supports techniques for flexible reference signal patterns in wireless communications systems in accordance with aspects of the present disclosure. The communications manager 1105 may be an example of aspects of a communications manager 915, a communications manager 1015, or a communications manager 1210 described herein. The communications manager 1105 may include a configuration receiver 1110, a TRS receiver 1120, a BWP component 1125, a configuration selection component 1130, a DCI component 1135, a timer component 1140, a control signal component 1145, an aperiodic message component 1150, a TCI component 1155, a first message component 1160, a second message component 1165, and a TRS component 1170. Each of these modules may communicate, directly or indirectly, with one another (e.g., via one or more buses).

The configuration receiver 1110 may receive, from a base station, a first tracking reference signal configuration and a second tracking reference signal configuration, the first tracking reference signal configuration including a first set of parameters and the second tracking reference signal configuration including a second set of parameters. In some cases, the first set of parameters, the second set of parameters, or both include a length of a tracking reference signal burst in a quantity of slots, a tracking reference signal burst periodicity in the quantity of slots, a quantity of symbols for the tracking reference signal within a slot, a tracking reference signal bandwidth, a tracking reference signal subcarrier spacing, or a tracking reference signal symbol spacing within the slot.

The TRS receiver 1120 may receive, from the base station and based on an indicator for selection from among the first tracking reference signal configuration and the second tracking reference signal configuration, a tracking reference signal in accordance with the first tracking reference signal configuration or the second tracking reference signal configuration.

The TRS component 1170 may receive a tracking reference signal in accordance with a tracking reference signal configuration indicated by the indicator of the second message. In some cases, the indicator indicates the selected tracking reference signal configuration.

The BWP component 1125 may identify a first bandwidth part for communication with the base station over a first set of time resources, the first bandwidth part associated with the first tracking reference signal configuration, where the indicator includes the first bandwidth part. In some examples, the BWP component 1125 may identify a second bandwidth part for communication with the base station over a second set of time resources, the second bandwidth part associated with the second tracking reference signal configuration, where the indicator includes the second bandwidth part.

The configuration selection component 1130 may select the first tracking reference signal configuration for the first set of time resources based on identifying the first bandwidth part. In some examples, the configuration selection component 1130 may select the second tracking reference signal configuration for the second set of time resources based on identifying the second bandwidth part. In some examples, the configuration selection component 1130 may select the first tracking reference signal configuration based on receiving the control signaling.

In some examples, the configuration selection component 1130 may select the second tracking reference signal configuration for a second tracking reference signal based on receiving the second control signaling. In some examples, the TRS receiver 1120 may receive the tracking reference signal and the second tracking reference signal over a same bandwidth part.

In some examples, the configuration selection component 1130 may select the second tracking reference signal configuration based on identifying the indicator that is the aperiodic tracking reference signal trigger, the second tracking reference signal configuration different than the first tracking reference signal configuration associated with periodic transmission of the tracking reference signal.

The DCI component 1135 may receive, from the base station, downlink control information including an indication of the second bandwidth part.

The timer component 1140 may determine that a timer associated with the first bandwidth part has expired, where switching from the first bandwidth part to the second bandwidth part is based on the determining.

The control signal component 1145 may receive, from the base station, control signaling including the indicator for selection. In some examples, the control signal component 1145 may receive, from the base station, second control signaling including a second indicator for selection from among the first tracking reference signal configuration and the second tracking reference signal configuration. In some cases, the control signaling includes an RRC signal, a MAC-CE, or DCI.

The aperiodic message component 1150 may receive, from the base station, a message including an aperiodic tracking reference signal trigger, where the indicator includes the aperiodic tracking reference signal trigger.

The TCI component 1155 may identify that the indicator is associated with a first transmission configuration indicator state, the first transmission configuration indicator state corresponding to the first tracking reference signal configuration. In some examples, the TRS receiver 1120 may receive, from the base station and based on the identified indicator, the tracking reference signal in accordance with the first tracking reference signal configuration based on the indicator that is the first transmission configuration indicator state. In some cases, a first synchronization signal block is quasi co-located with the first transmission configuration indicator state and a second synchronization signal block is quasi co-located with a second transmission configuration indicator state, and where the indicator includes a characteristic associated with the first synchronization signal block or the second synchronization signal block.

The first message component 1160 may transmit, to a base station, a first message of a random access channel procedure.

The second message component 1165 may receive, from the base station, a second message of the random access channel procedure in response to transmitting the first message, the second message including an indicator for triggering a tracking reference signal transmission.

Figure 12:
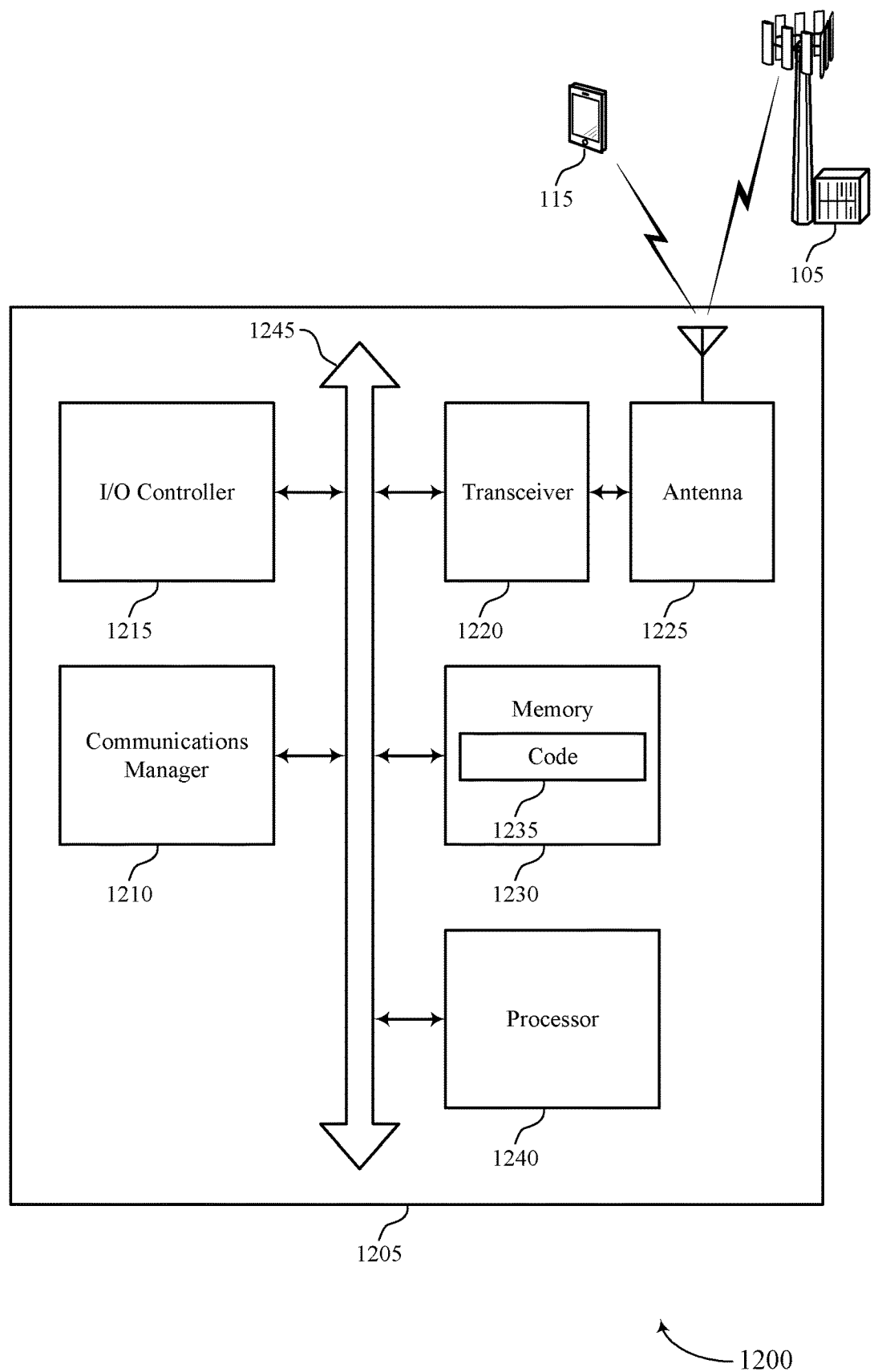
FIG. 12 shows a diagram of a system including a device that supports techniques for flexible reference signal patterns in wireless communications systems in accordance with aspects of the present disclosure.

FIG. 12 shows a diagram of a system 1200 including a device 1205 that supports techniques for flexible reference signal patterns in wireless communications systems in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive, from a base station, a first tracking reference signal configuration and a second tracking reference signal configuration, the first tracking reference signal configuration including a first set of parameters and the second tracking reference signal configuration including a second set of parameters, and receive, from the base station and based on an indicator for selection from among the first tracking reference signal configuration and the second tracking reference signal configuration, a tracking reference signal in accordance with the first tracking reference signal configuration or the second tracking reference signal configuration. The communications manager 1210 may also transmit, to a base station, a first message of a random access channel procedure, receive, from the base station, a second message of the random access channel procedure in response to transmitting the first message, the second message including an indicator for triggering a tracking reference signal transmission, and receive, from the base station, a tracking reference signal in accordance with a tracking reference signal configuration indicated by the indicator of the second message.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for flexible reference signal patterns in wireless communications systems).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
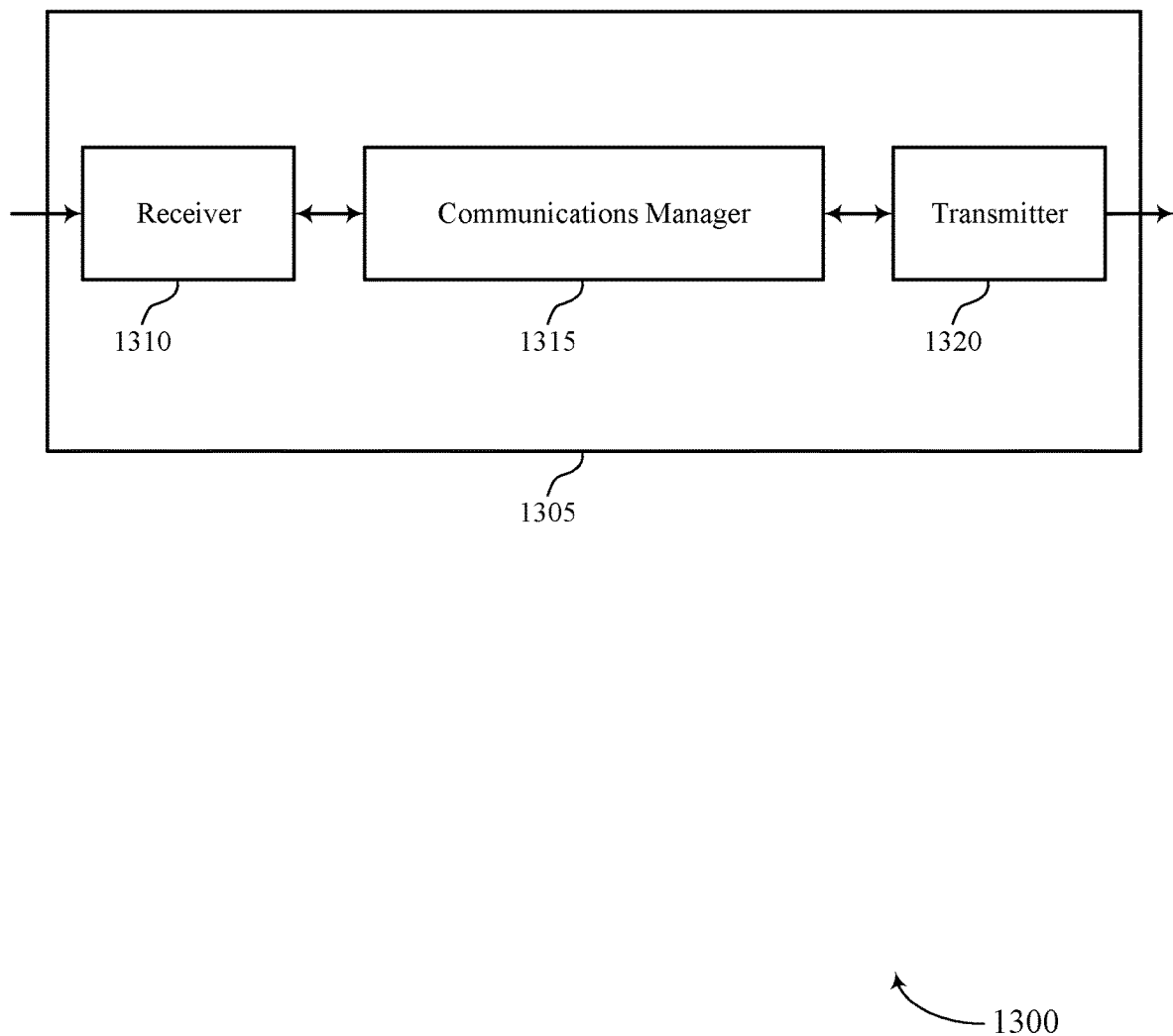
FIGS. 13 and 14 show block diagrams of devices that support techniques for flexible reference signal patterns in wireless communications systems in accordance with aspects of the present disclosure.

FIG. 13 shows a block diagram 1300 of a device 1305 that supports techniques for flexible reference signal patterns in wireless communications systems in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to techniques for flexible reference signal patterns in wireless communications systems, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may transmit, to one or more UEs, a first tracking reference signal configuration and a second tracking reference signal configuration, the first tracking reference signal configuration including a first set of parameters and the second tracking reference signal configuration including a second set of parameters, and transmit, to the one or more UEs and based on an indicator for selection from among the first tracking reference signal configuration and the second tracking reference signal configuration, a tracking reference signal in accordance with the first tracking reference signal configuration or the second tracking reference signal configuration. The communications manager 1315 may also receive, from one or more UEs, a first message of a random access channel procedure, transmit, to the one or more UEs, a second message of the random access channel procedure in response to transmitting the first message, the second message including an indicator for triggering a tracking reference signal transmission, and transmit, to the one or more UEs, a tracking reference signal in accordance with a tracking reference signal configuration indicated by the indicator of the second message. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
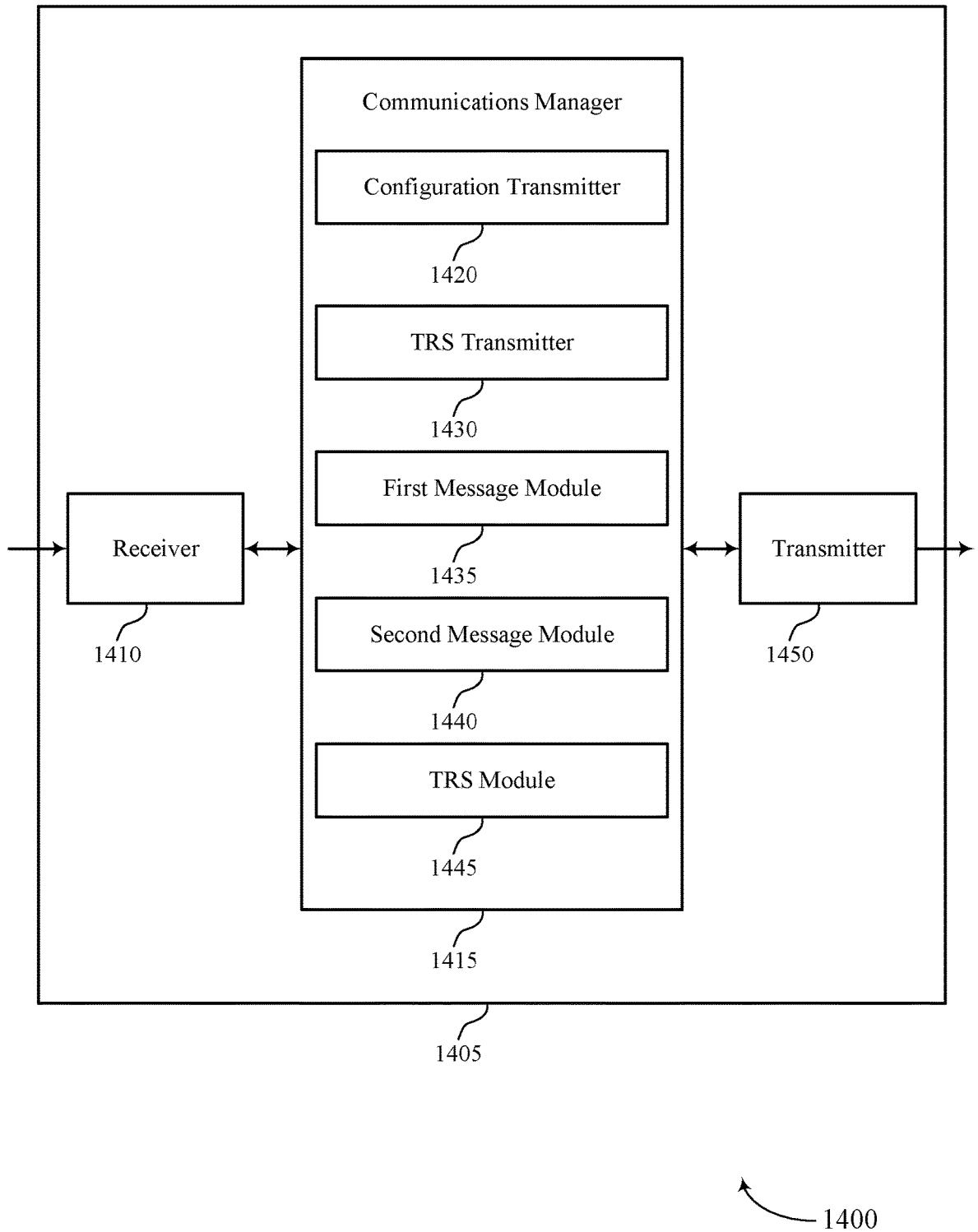

FIG. 14 shows a block diagram 1400 of a device 1405 that supports techniques for flexible reference signal patterns in wireless communications systems in accordance with aspects of the present disclosure. The device 1405 may be an example of aspects of a device 1305, or a base station 105 as described herein. The device 1405 may include a receiver 1410, a communications manager 1415, and a transmitter 1450. The device 1405 may also include a processor. Each of these components may be in communication with one another (e.g., via one or more buses).

The receiver 1410 may receive information such as packets, user data, or control information associated with various information channels (e.g., control channels, data channels, and information related to techniques for flexible reference signal patterns in wireless communications systems, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a configuration transmitter 1420, a TRS transmitter 1430, a first message module 1435, a second message module 1440, and a TRS module 1445. The communications manager 1415 may be an example of aspects of the communications manager 1610 described herein.

The configuration transmitter 1420 may transmit, to one or more UEs, a first tracking reference signal configuration and a second tracking reference signal configuration, the first tracking reference signal configuration including a first set of parameters and the second tracking reference signal configuration including a second set of parameters.

The TRS transmitter 1430 may transmit, to the one or more UEs and based on an indicator for selection from among the first tracking reference signal configuration and the second tracking reference signal configuration, a tracking reference signal in accordance with the first tracking reference signal configuration or the second tracking reference signal configuration.

The first message module 1435 may receive, from one or more UEs, a first message of a random access channel procedure.

The second message module 1440 may transmit, to the one or more UEs, a second message of the random access channel procedure in response to transmitting the first message, the second message including an indicator for triggering a tracking reference signal transmission.

The TRS module 1445 may transmit, to the one or more UEs, a tracking reference signal in accordance with a tracking reference signal configuration indicated by the indicator of the second message.

The transmitter 1450 may transmit signals generated by other components of the device 1405. In some examples, the transmitter 1450 may be collocated with a receiver 1410 in a transceiver module. For example, the transmitter 1450 may be an example of aspects of the transceiver 1620 described with reference to FIG. 16. The transmitter 1450 may utilize a single antenna or a set of antennas.

Figure 15:
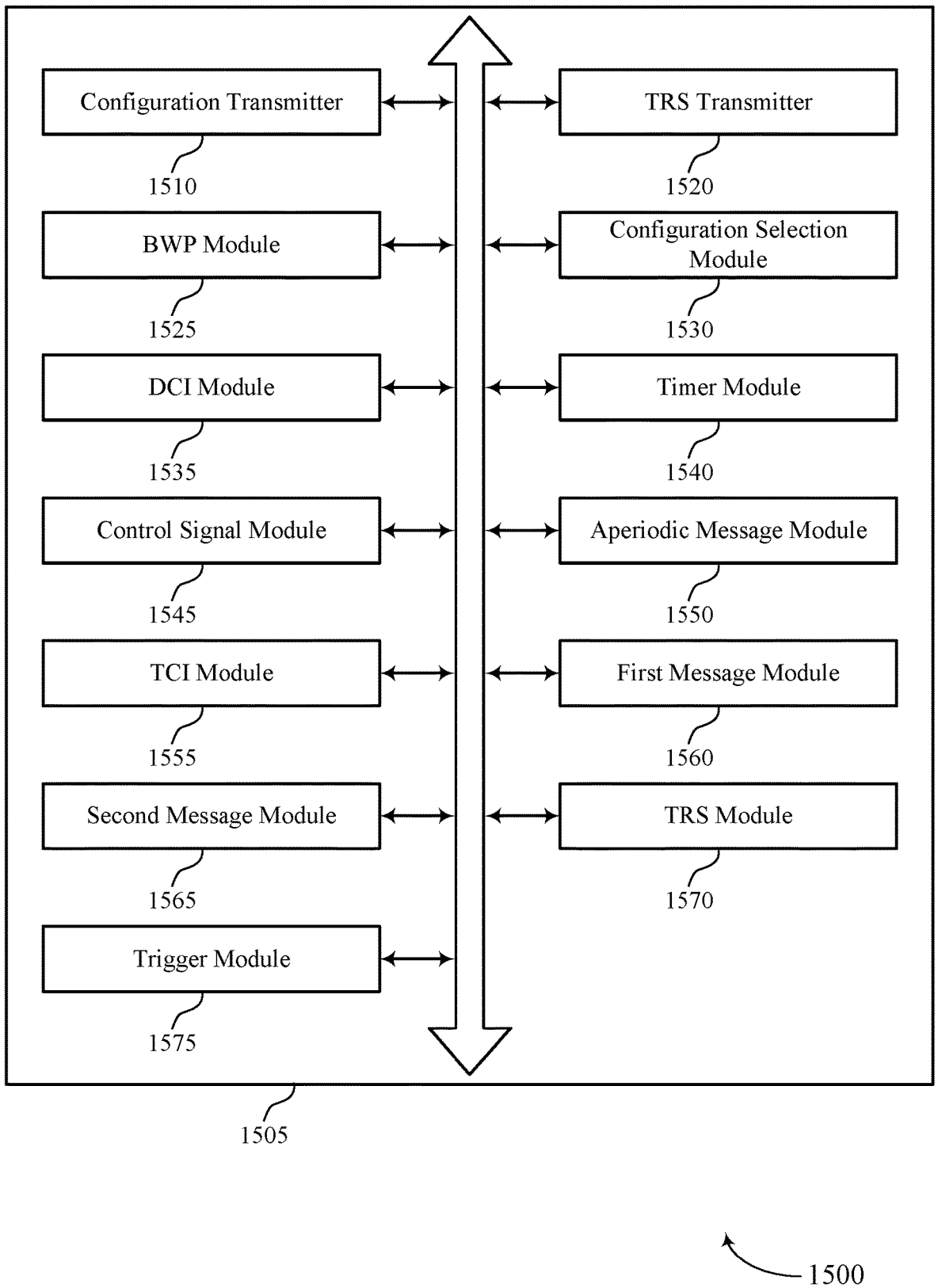
FIG. 15 shows a block diagram of a communications manager that supports techniques for flexible reference signal patterns in wireless communications systems in accordance with aspects of the present disclosure.

FIG. 15 shows a block diagram 1500 of a communications manager 1505 that supports techniques for flexible reference signal patterns in wireless communications systems in accordance with aspects of the present disclosure. The communications manager 1505 may be an example of aspects of a communications manager 1315, a communications manager 1415, or a communications manager 1610 described herein. The communications manager 1505 may include a configuration transmitter 1510, a TRS transmitter 1520, a BWP module 1525, a configuration selection module 1530, a DCI module 1535, a timer module 1540, a control signal module 1545, an aperiodic message module 1550, a TCI module 1555, a first message module 1560, a second message module 1565, a TRS module 1570, and a trigger module 1575. Each of these modules may communicate, directly or indirectly, with one another (e.g., via one or more buses).

The configuration transmitter 1510 may transmit, to one or more UEs, a first tracking reference signal configuration and a second tracking reference signal configuration, the first tracking reference signal configuration including a first set of parameters and the second tracking reference signal configuration including a second set of parameters. In some cases, the first set of parameters, the second set of parameters, or both include a length of a tracking reference signal burst in a quantity of slots, a tracking reference signal burst periodicity in the quantity of slots, a quantity of symbols for the tracking reference signal within a slot, a tracking reference signal bandwidth, a tracking reference signal subcarrier spacing, or a tracking reference signal symbol spacing within the slot.

The TRS transmitter 1520 may transmit, to the one or more UEs and based on an indicator for selection from among the first tracking reference signal configuration and the second tracking reference signal configuration, a tracking reference signal in accordance with the first tracking reference signal configuration or the second tracking reference signal configuration. In some examples, the TRS transmitter 1520 may transmit the tracking reference signal and the second tracking reference signal in accordance with a same bandwidth part configuration. In some examples, the TRS transmitter 1520 may transmit, based on the indicator, the tracking reference signal in accordance with the first tracking reference signal configuration based on identifying the indicator that is a first transmission configuration indicator.

The TRS module 1570 may transmit a tracking reference signal in accordance with a tracking reference signal configuration indicated by the indicator of the second message.

The BWP module 1525 may identify a first bandwidth part for receiving the tracking reference signal, the first bandwidth part associated with the first tracking reference signal configuration, where the indicator includes the first bandwidth part. In some examples, the BWP module 1525 may identify a second bandwidth part for transmitting the tracking reference signal, the second bandwidth part associated with the second tracking reference signal configuration, where the indicator includes the second bandwidth part. In some examples, the BWP module 1525 may switch from the first bandwidth part to the second bandwidth part based on identifying the second bandwidth part.

The configuration selection module 1530 may select the first tracking reference signal configuration based on identifying the first bandwidth part. In some examples, the configuration selection module 1530 may select the second tracking reference signal configuration based on switching from the first bandwidth part to the second bandwidth part. In some examples, the configuration selection module 1530 may select the first tracking reference signal configuration based on transmitting the control signaling.

In some examples, the configuration selection module 1530 may select the second tracking reference signal configuration for a second tracking reference signal based on transmitting the second control signaling. In some examples, the configuration selection module 1530 may select the second tracking reference signal configuration based on transmitting the message, the second tracking reference signal configuration different than the first tracking reference signal configuration associated with periodic transmission of the tracking reference signal.

The DCI module 1535 may transmit, to the one or more UEs, downlink control information including an indication of the second bandwidth part.

The timer module 1540 may determine that a timer associated with the first bandwidth part has expired, where switching from the first bandwidth part to the second bandwidth part is based on the determining.

The control signal module 1545 may transmit, to the one or more UEs, control signaling including the indicator for selection. In some examples, the control signal module 1545 may transmit, to the one or more UEs, second control signaling including a second indicator for selection from among the first tracking reference signal configuration and the second tracking reference signal configuration. In some cases, the control signaling includes a RRC signal, a MAC-CE, or DCI.

The aperiodic message module 1550 may transmit, to the one or more UEs, a message including an aperiodic tracking reference signal trigger, where the indicator includes the aperiodic tracking reference signal trigger.

The TCI module 1555 may identify the indicator that is a first transmission configuration indicator state, the first transmission configuration indicator state corresponding to the first tracking reference signal configuration. In some cases, the tracking reference signal is quasi co-located with a first synchronization signal block different than a second synchronization signal block quasi co-located with a second tracking reference signal, where the tracking reference signal corresponds to the first tracking reference signal configuration and the second tracking reference signal corresponds to the second tracking reference signal configuration.

The trigger module 1575 may determine to trigger the tracking reference signal configuration for a UE of a set of UEs, or the trigger module 1575 may determine to trigger the tracking reference signal configuration for the set of UEs.

The first message module 1560 may receive, from one or more UEs, a first message of a random access channel procedure. In some cases, the tracking reference signal configuration includes a set of parameters, the set of parameters including a length of a tracking reference signal burst in a quantity of slots, a tracking reference signal burst periodicity in the quantity of slots, a quantity of symbols for the tracking reference signal within a slot, a tracking reference signal bandwidth, a tracking reference signal subcarrier spacing, or a tracking reference signal symbol spacing within the slot.

The second message module 1565 may transmit, to the one or more UEs, a second message of the random access channel procedure in response to transmitting the first message, the second message including an indicator for triggering a tracking reference signal transmission. In some cases, the indicator indicates the tracking reference signal configuration.

Figure 16:
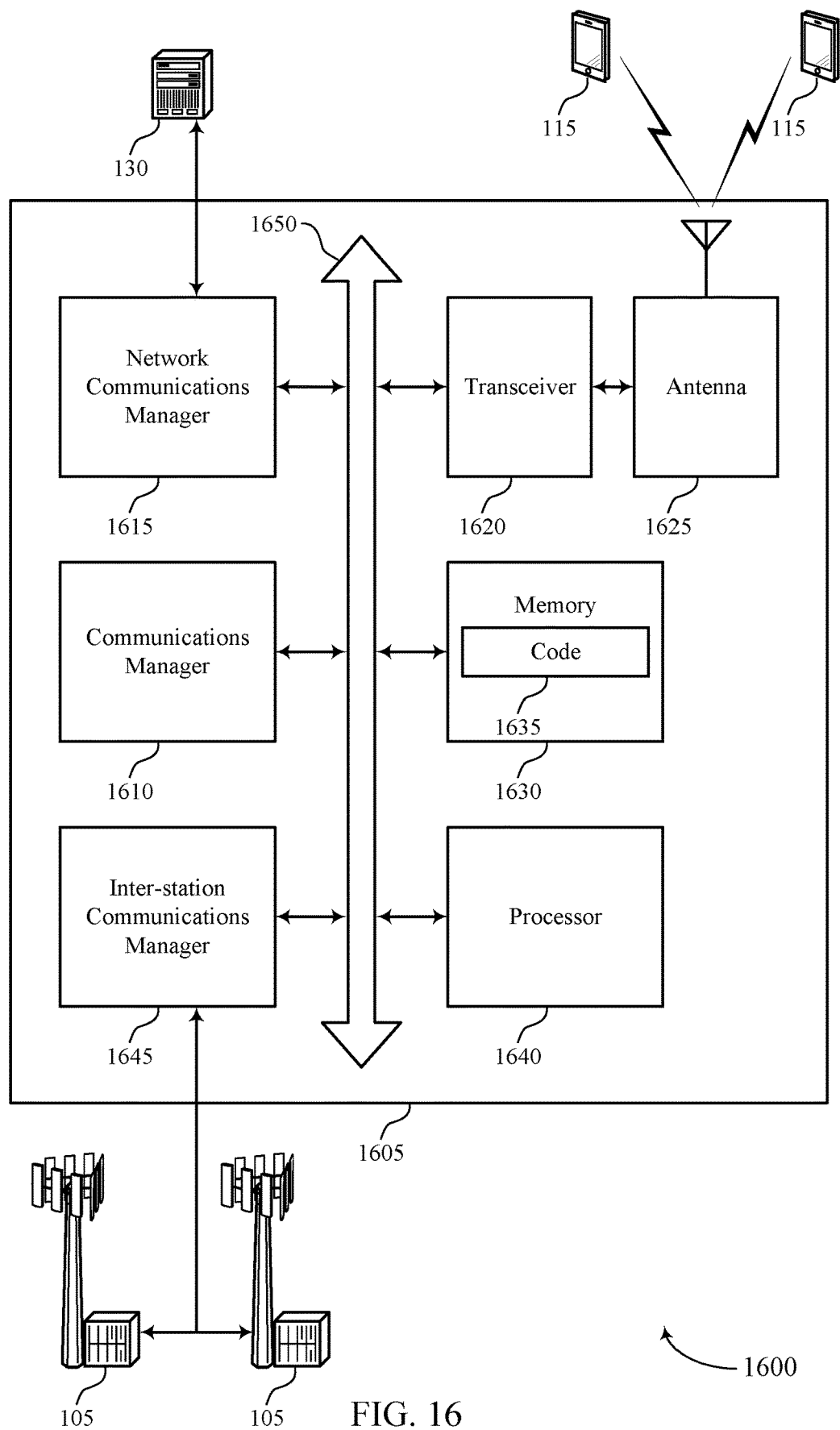
FIG. 16 shows a diagram of a system including a device that supports techniques for flexible reference signal patterns in wireless communications systems in accordance with aspects of the present disclosure.

FIG. 16 shows a diagram of a system 1600 including a device 1605 that supports techniques for flexible reference signal patterns in wireless communications systems in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may transmit, to one or more UEs, a first tracking reference signal configuration and a second tracking reference signal configuration, the first tracking reference signal configuration including a first set of parameters and the second tracking reference signal configuration including a second set of parameters, and transmit, to the one or more UEs and based on an indicator for selection from among the first tracking reference signal configuration and the second tracking reference signal configuration, a tracking reference signal in accordance with the first tracking reference signal configuration or the second tracking reference signal configuration. The communications manager 1610 may also receive, from one or more UEs, a first message of a random access channel procedure, transmit, to the one or more UEs, a second message of the random access channel procedure in response to transmitting the first message, the second message including an indicator for triggering a tracking reference signal transmission, and transmit, to the one or more UEs, a tracking reference signal in accordance with a tracking reference signal configuration indicated by the indicator of the second message.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting techniques for flexible reference signal patterns in wireless communications systems).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
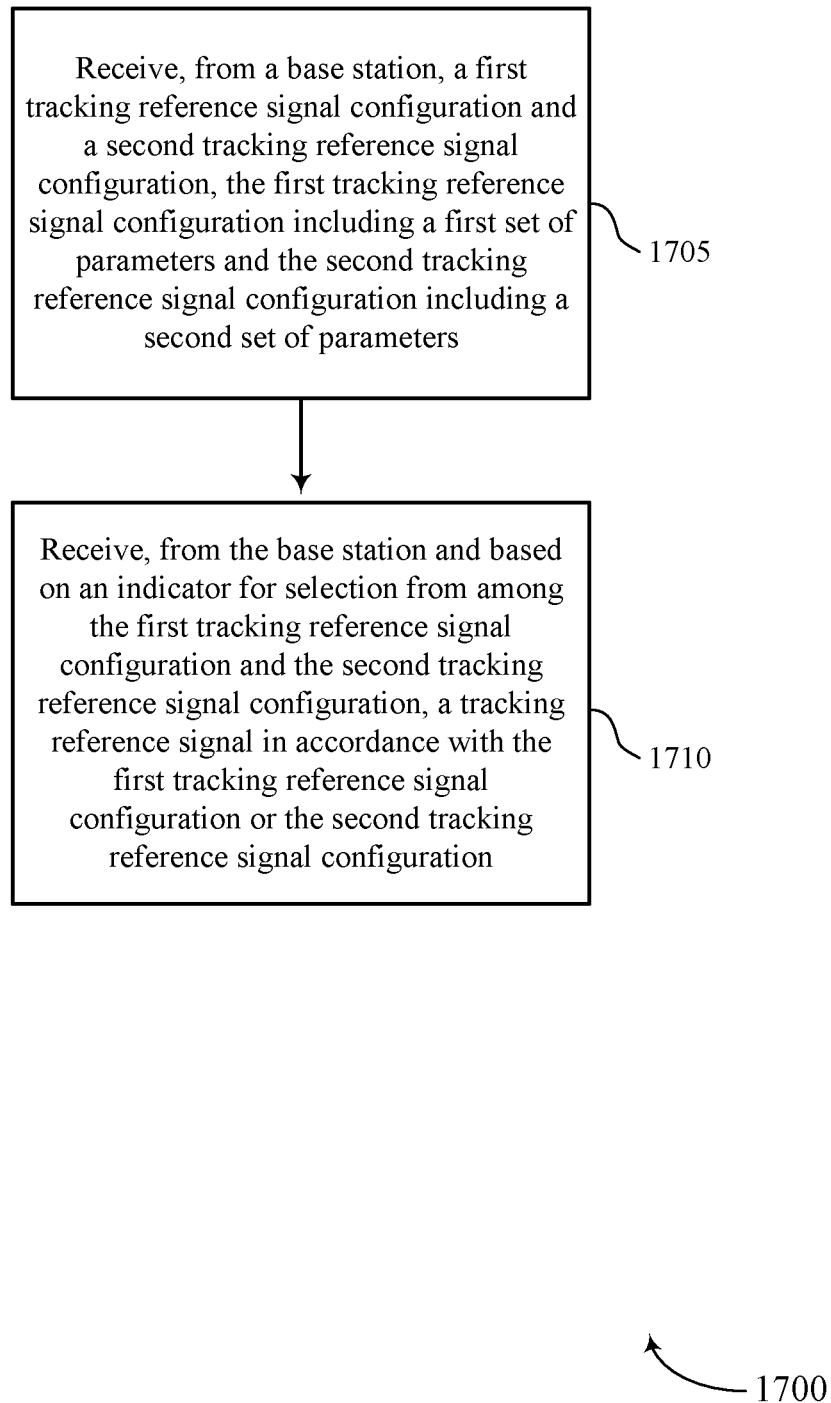
FIGS. 17 through 20 show flowcharts illustrating methods that support techniques for flexible reference signal patterns

FIG. 17 shows a flowchart illustrating a method 1700 that supports techniques for flexible reference signal patterns in wireless communications systems in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1705, the UE may receive, from a base station, a first tracking reference signal configuration and a second tracking reference signal configuration, the first tracking reference signal configuration including a first set of parameters and the second tracking reference signal configuration including a second set of parameters. The operations of 1705 may be performed according to the methods described herein. In some examples, aspects of the operations of 1705 may be performed by a configuration receiver as described with reference to FIGS. 9 through 12.

At 1710, the UE may receive, from the base station and based on an indicator for selection from among the first tracking reference signal configuration and the second tracking reference signal configuration, a tracking reference signal in accordance with the first tracking reference signal configuration or the second tracking reference signal configuration. The operations of 1710 may be performed according to the methods described herein. In some examples, aspects of the operations of 1710 may be performed by a TRS transmitter as described with reference to FIGS. 9 through 12.

Figure 18:
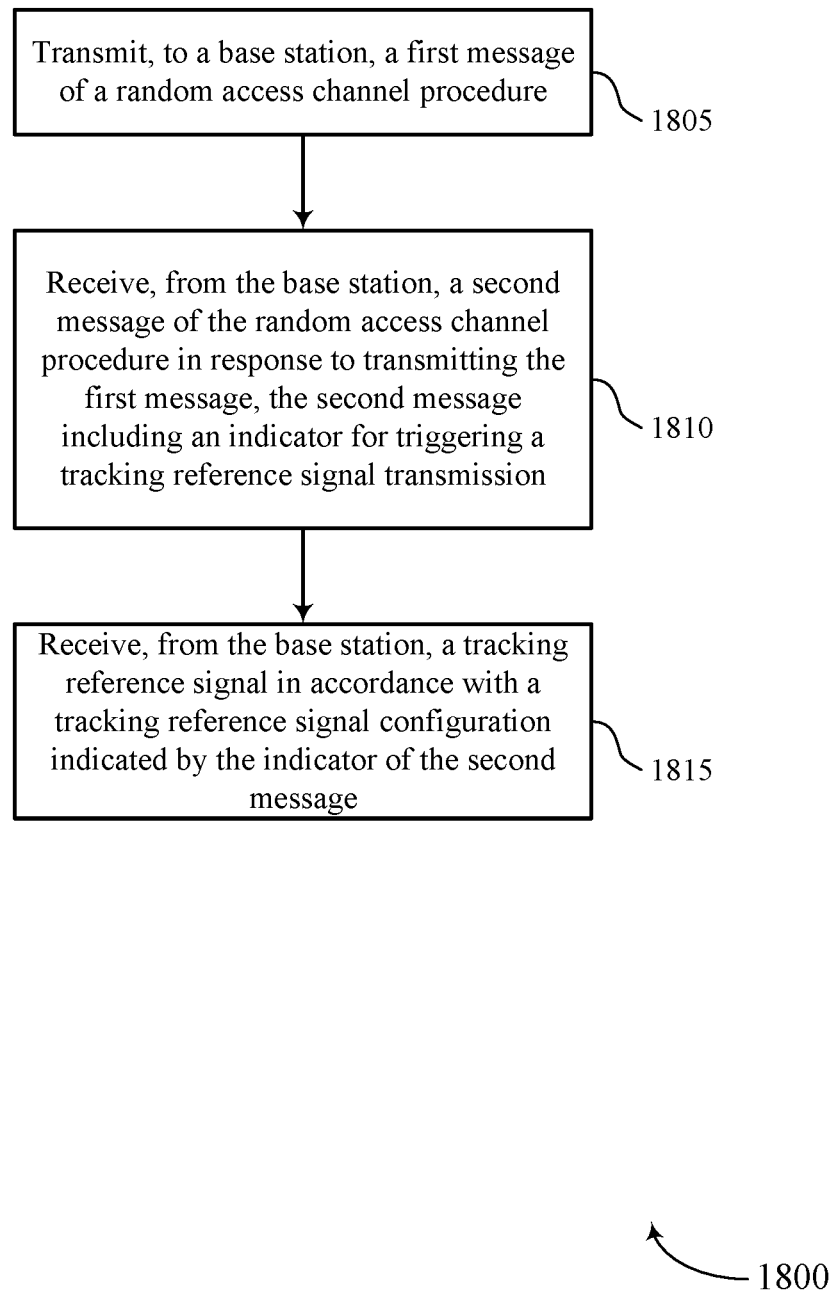

FIG. 18 shows a flowchart illustrating a method 1800 that supports techniques for flexible reference signal patterns in wireless communications systems in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1805, the UE may transmit, to a base station, a first message of a random access channel procedure. The operations of 1805 may be performed according to the methods described herein. In some examples, aspects of the operations of 1805 may be performed by a first message component as described with reference to FIGS. 9 through 12.

At 1810, the UE may receive, from the base station, a second message of the random access channel procedure in response to transmitting the first message, the second message including an indicator for triggering a tracking reference signal transmission. The operations of 1810 may be performed according to the methods described herein. In some examples, aspects of the operations of 1810 may be performed by a second message component as described with reference to FIGS. 9 through 12.

At 1815, the UE may receive, from the base station, a tracking reference signal in accordance with a tracking reference signal configuration indicated by the indicator of the second message. The operations of 1815 may be performed according to the methods described herein. In some examples, aspects of the operations of 1815 may be performed by a TRS component as described with reference to FIGS. 9 through 12.

Figure 19:
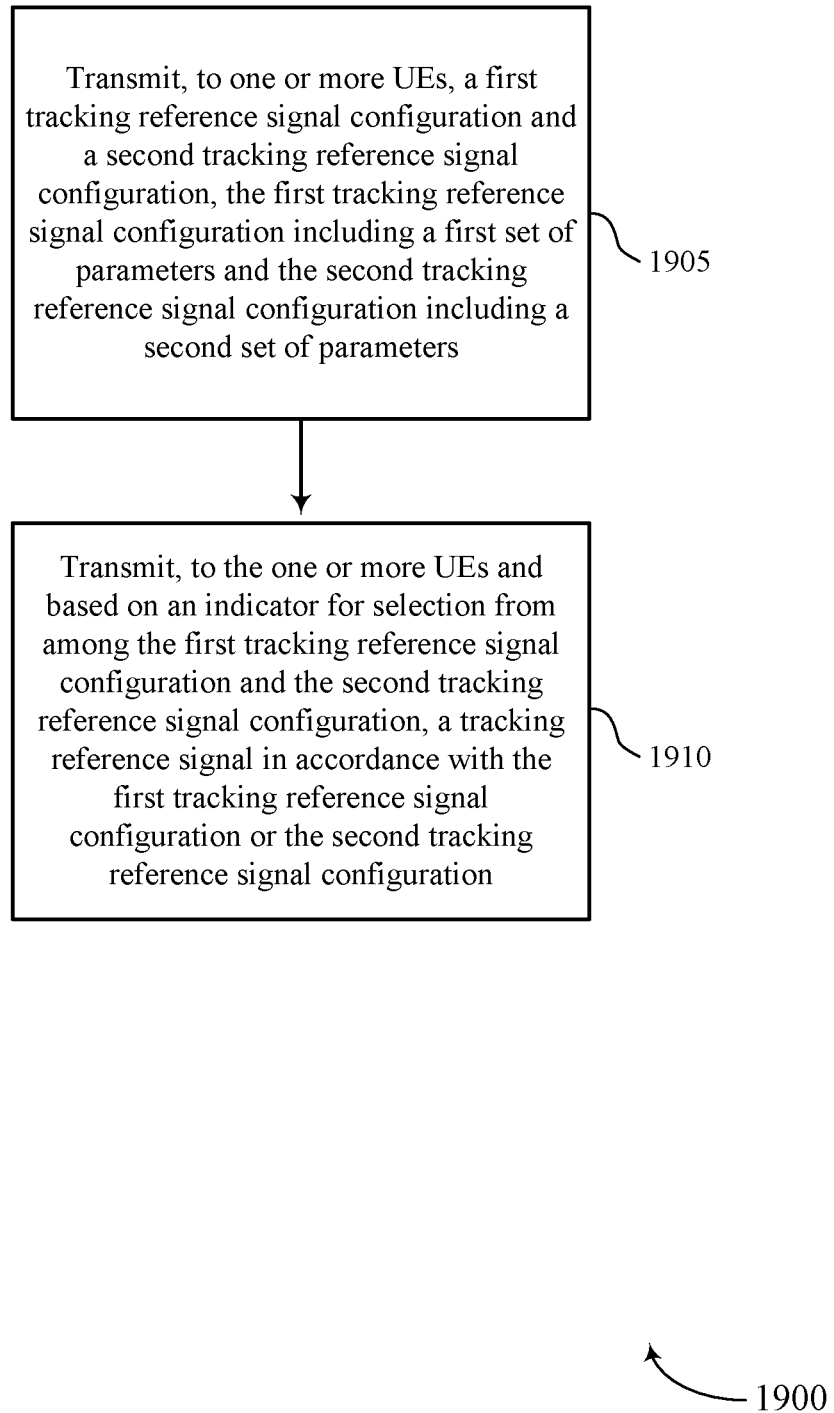

FIG. 19 shows a flowchart illustrating a method 1900 that supports techniques for flexible reference signal patterns in wireless communications systems in accordance with aspects of the present disclosure. The operations of method 1900 may be implemented by a base station 105 or its components as described herein. For example, the operations of method 1900 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 1905, the base station may transmit, to one or more UEs, a first tracking reference signal configuration and a second tracking reference signal configuration, the first tracking reference signal configuration including a first set of parameters and the second tracking reference signal configuration including a second set of parameters. The operations of 1905 may be performed according to the methods described herein. In some examples, aspects of the operations of 1905 may be performed by a configuration transmitter as described with reference to FIGS. 13 through 16.

At 1910, the base station may transmit, to the one or more UEs and based on an indicator for selection from among the first tracking reference signal configuration and the second tracking reference signal configuration, a tracking reference signal in accordance with the first tracking reference signal configuration or the second tracking reference signal configuration. The operations of 1910 may be performed according to the methods described herein. In some examples, aspects of the operations of 1910 may be performed by a TRS receiver as described with reference to FIGS. 13 through 16.

Figure 20:
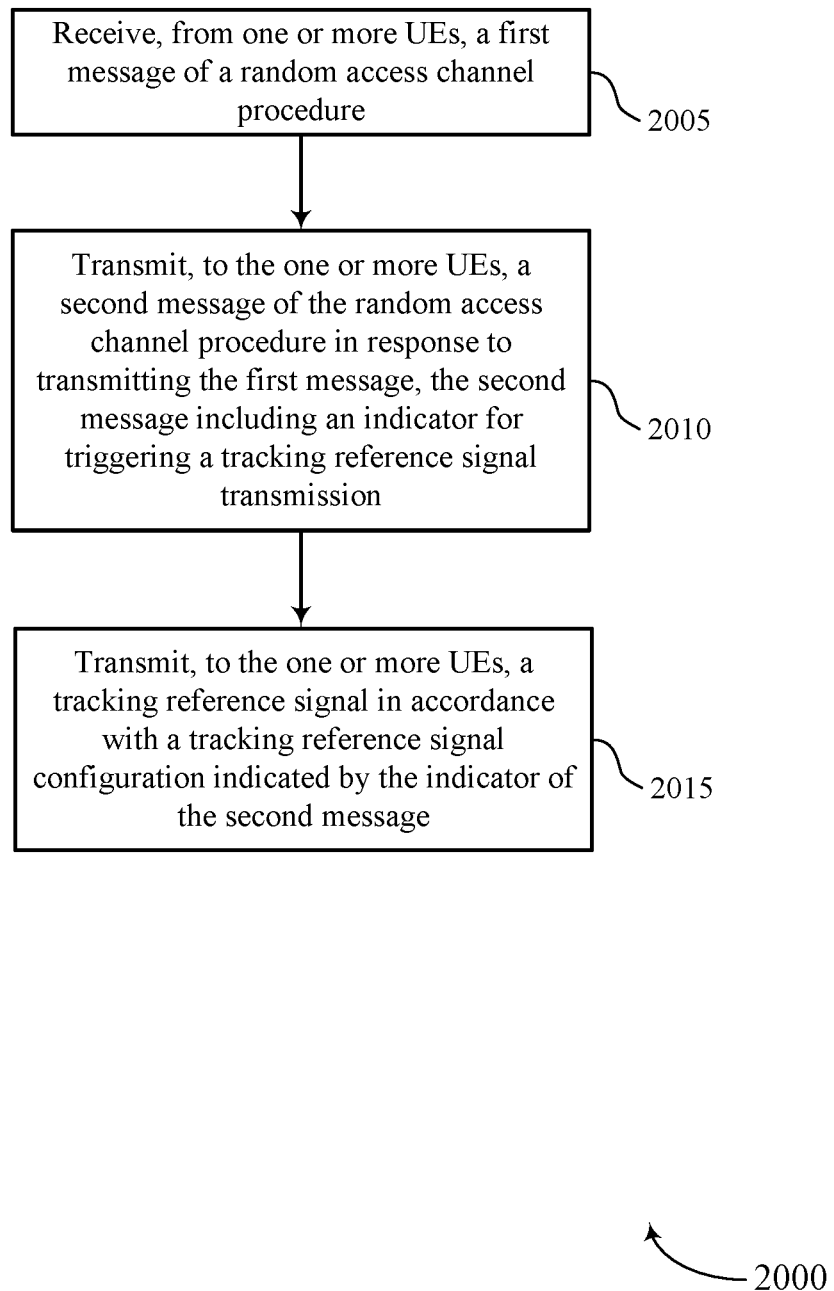

FIG. 20 shows a flowchart illustrating a method 2000 that supports techniques for flexible reference signal patterns in wireless communications systems in accordance with aspects of the present disclosure. The operations of method 2000 may be implemented by a base station 105 or its components as described herein. For example, the operations of method 2000 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2005, the base station may receive, from one or more UEs, a first message of a random access channel procedure. The operations of 2005 may be performed according to the methods described herein. In some examples, aspects of the operations of 2005 may be performed by a first message module as described with reference to FIGS. 13 through 16.

At 2010, the base station may transmit, to the one or more UEs, a second message of the random access channel procedure in response to transmitting the first message, the second message including an indicator for triggering a tracking reference signal transmission. The operations of 2010 may be performed according to the methods described herein. In some examples, aspects of the operations of 2010 may be performed by a second message module as described with reference to FIGS. 13 through 16.

At 2015, the base station may transmit, to the one or more UEs, a tracking reference signal in accordance with a tracking reference signal configuration indicated by the indicator of the second message. The operations of 2015 may be performed according to the methods described herein. In some examples, aspects of the operations of 2015 may be performed by a TRS module as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

The following aspects are given by way of illustration. Examples of the following aspects may be combined with examples or embodiments shown or discusses in relation to the figures or elsewhere herein.

Aspect 1 is a method of wireless communications at a UE that includes receiving, from a base station, a first tracking reference signal configuration and a second tracking reference signal configuration, the first tracking reference signal configuration including a first set of parameters and the second tracking reference signal configuration including a second set of parameters, and receiving, from the base station and based on an indicator for selection from among the first tracking reference signal configuration and the second tracking reference signal configuration, a tracking reference signal in accordance with the first tracking reference signal configuration or the second tracking reference signal configuration.

In Aspect 2, the method of Aspect 1 includes identifying a first bandwidth part for communication with the base station over a first set of time resources, the first bandwidth part associated with the first tracking reference signal configuration, where the indicator includes the first bandwidth part, and selecting the first tracking reference signal configuration for the first set of time resources based on identifying the first bandwidth part.

In Aspect 3, the method of any of aspects 1-2 includes identifying a second bandwidth part for communication with the base station over a second set of time resources, the second bandwidth part associated with the second tracking reference signal configuration, where the indicator includes the second bandwidth part, and selecting the second tracking reference signal configuration for the second set of time resources based on identifying the second bandwidth part.

In Aspect 4, the method of any of aspects 1-3 includes receiving, from the base station, downlink control information including an indication of the second bandwidth part.

In Aspect 5, the method of any of aspects 1-4 includes determining that a timer associated with the first bandwidth part may have expired, where switching from the first bandwidth part to the second bandwidth part may be based on the determining.

In Aspect 6, the method of any of aspects 1-5 includes receiving, from the base station, control signaling including the indicator for selection, and selecting the first tracking reference signal configuration based on receiving the control signaling.

In Aspect 7, the method of any of aspects 1-6 includes receiving, from the base station, second control signaling including a second indicator for selection from among the first tracking reference signal configuration and the second tracking reference signal configuration, and selecting the second tracking reference signal configuration for a second tracking reference signal based on receiving the second control signaling.

In Aspect 8, the method of any of aspects 1-7 includes receiving, from the base station, the tracking reference signal and the second tracking reference signal over a same bandwidth part.

In Aspect 9, the control signaling of any of aspects 1-8 includes a radio resource control signal, a medium access control control element, or downlink control information.

In Aspect 10, the method of any of aspects 1-9 includes receiving, from the base station, a message including an aperiodic tracking reference signal trigger, where the indicator includes the aperiodic tracking reference signal trigger.

In Aspect 11, the method of any of aspects 1-10 includes selecting the second tracking reference signal configuration based on identifying the indicator that may be the aperiodic tracking reference signal trigger, the second tracking reference signal configuration different than the first tracking reference signal configuration associated with periodic transmission of the tracking reference signal.

In Aspect 12, the method of any of aspects 1-11 includes identifying that the indicator may be associated with a first transmission configuration indicator state, the first transmission configuration indicator state corresponding to the first tracking reference signal configuration, and receiving, from the base station, based on the indicator, the tracking reference signal in accordance with the first tracking reference signal configuration based on identifying the indicator that may be the first transmission configuration indicator state.

Aspect 13 may include any of aspects 1-12, where a first synchronization signal block may be quasi co-located with the first transmission configuration indicator state and a second synchronization signal block may be quasi co-located with a second transmission configuration indicator state, and where the indicator includes a characteristic associated with the first synchronization signal block or the second synchronization signal block.

In Aspect 14, the first set of parameters, the second set of parameters, or both of any of aspects 1-13 includes a length of a tracking reference signal burst in a quantity of slots, a tracking reference signal burst periodicity in the quantity of slots, a quantity of symbols for the tracking reference signal within a slot, a tracking reference signal bandwidth, a tracking reference signal subcarrier spacing, or a tracking reference signal symbol spacing within the slot.

Aspect 15 is a system or apparatus including means for implementing a method or realizing an apparatus as in any of aspects 1-14.

Aspect 16 is a non-transitory computer-readable medium storing instructions executable by one or more processors to cause the one or more processors to implement a method as in any of aspects 1-14.

Aspect 17 is a system including one or more processors and memory in electronic communication with the one or more processors storing instructions executable by the one or more processors to cause the system or apparatus to implement a method as in any of aspects 1-14.

Aspect 18 is a method of wireless communications at a UE that includes transmitting, to a base station, a first message of a random access channel procedure, receiving, from the base station, a second message of the random access channel procedure in response to transmitting the first message, the second message including an indicator for triggering a tracking reference signal transmission, and receiving, from the base station, a tracking reference signal in accordance with a tracking reference signal configuration indicated by the indicator of the second message.

Aspect 19 may include the method of Aspect 18, where the indicator indicates the selected tracking reference signal configuration.

Aspect 20 may include the method of any of aspects 18-19, where the tracking reference signal configuration includes a set of parameters, the set of parameters including a length of a tracking reference signal burst in a quantity of slots, a tracking reference signal burst periodicity in the quantity of slots, a quantity of symbols for the tracking reference signal within a slot, a tracking reference signal bandwidth, a tracking reference signal subcarrier spacing, or a tracking reference signal symbol spacing within the slot.

Aspect 21 is a system or apparatus including means for implementing a method or realizing an apparatus as in any of aspects 18-20.

Aspect 22 is a non-transitory computer-readable medium storing instructions executable by one or more processors to cause the one or more processors to implement a method as in any of aspects 18-20.

Aspect 23 is a system including one or more processors and memory in electronic communication with the one or more processors storing instructions executable by the one or more processors to cause the system or apparatus to implement a method as in any of aspects 18-20.

Aspect 24 is a method of wireless communications at a base station that includes transmitting, to one or more UEs, a first tracking reference signal configuration and a second tracking reference signal configuration, the first tracking reference signal configuration including a first set of parameters and the second tracking reference signal configuration including a second set of parameters, and transmitting, to the one or more UEs and based on an indicator for selection from among the first tracking reference signal configuration and the second tracking reference signal configuration, a tracking reference signal in accordance with the first tracking reference signal configuration or the second tracking reference signal configuration.

In Aspect 25, the method of Aspect 24 includes identifying a first bandwidth part for receiving the tracking reference signal, the first bandwidth part associated with the first tracking reference signal configuration, where indicator includes the first bandwidth part, and selecting the first tracking reference signal configuration based on identifying the first bandwidth part.

In Aspect 26, the method of any of aspects 24-25 includes identifying a second bandwidth part for transmitting the tracking reference signal, the second bandwidth part associated with the second tracking reference signal configuration, where the indicator includes the second bandwidth part, switching from the first bandwidth part to the second bandwidth part based on identifying the second bandwidth part, and selecting the second tracking reference signal configuration based on switching from the first bandwidth part to the second bandwidth part.

In Aspect 27, the method of any of aspects 24-26 includes transmitting, to the one or more UEs, downlink control information including an indication of the second bandwidth part.

In Aspect 28, the method of any of aspects 24-27 includes determining that a timer associated with the first bandwidth part may have expired, where switching from the first bandwidth part to the second bandwidth part may be based on the determining.

In Aspect 29, the method of any of aspects 24-28 includes transmitting, to the one or more UEs, control signaling including the indicator for selection, and selecting the first tracking reference signal configuration based on transmitting the control signaling.

In Aspect 30, the method of any of aspects 24-29 includes transmitting, to the one or more UEs, second control signaling including a second indicator for selection from among the first tracking reference signal configuration and the second tracking reference signal configuration, and selecting the second tracking reference signal configuration for a second tracking reference signal based on transmitting the second control signaling.

In Aspect 31, the method of any of aspects 24-30 includes transmitting, to the one or more UEs, the tracking reference signal and the second tracking reference signal in accordance with a same bandwidth part configuration.

In Aspect 32, the control signaling of any of aspects 24-31 includes a radio resource control signal, a medium access control control element, or downlink control information.

In Aspect 33, the method of any of aspects 24-32 includes transmitting, to the one or more UEs, a message including an aperiodic tracking reference signal trigger, where the indicator includes the aperiodic tracking reference signal trigger.

In Aspect 34, the method of any of aspects 24-33 includes selecting the second tracking reference signal configuration based on transmitting the message, the second tracking reference signal configuration different than the first tracking reference signal configuration associated with periodic transmission of the tracking reference signal.

In Aspect 35, the method of any of aspects 24-34 includes identifying the indicator that may be a first transmission configuration indicator state, the first transmission configuration indicator state corresponding to the first tracking reference signal configuration, and receiving, based on the indicator, the tracking reference signal in accordance with the first tracking reference signal configuration based on the indicator that may be a first transmission configuration indicator.

Aspect 36 may include any of aspects 24-35, where the tracking reference signal may be quasi co-located with a first synchronization signal block different than a second synchronization signal block quasi co-located with a second tracking reference signal, where the tracking reference signal corresponds to the first tracking reference signal configuration and the second tracking reference signal corresponds to the second tracking reference signal configuration.

In Aspect 37, the first set of parameters, the second set of parameters, or both of any of aspects 24-36 includes a length of a tracking reference signal burst in a quantity of slots, a tracking reference signal burst periodicity in the quantity of slots, a quantity of symbols for the tracking reference signal within a slot, a tracking reference signal bandwidth, a tracking reference signal subcarrier spacing, or a tracking reference signal symbol spacing within the slot.

Aspect 38 is a system or apparatus including means for implementing a method or realizing an apparatus as in any of aspects 24-37.

Aspect 39 is a non-transitory computer-readable medium storing instructions executable by one or more processors to cause the one or more processors to implement a method as in any of aspects 24-37.

Aspect 40 is a system including one or more processors and memory in electronic communication with the one or more processors storing instructions executable by the one or more processors to cause the system or apparatus to implement a method as in any of aspects 24-37.

Aspect 41 is a method of wireless communications at a base station that includes receiving, from one or more UEs, a first message of a random access channel procedure, transmitting, to the one or more UEs, a second message of the random access channel procedure in response to transmitting the first message, the second message including an indicator for triggering a tracking reference signal transmission, and transmitting, to the one or more UEs, a tracking reference signal in accordance with a tracking reference signal configuration indicated by the indicator of the second message.

Aspect 42 may include the method of Aspect 41, where the indicator indicates the tracking reference signal configuration.

In Aspect 43, the method of any of aspects 41-42 includes determining to trigger the tracking reference signal configuration for a UE of a set of UEs, or determining to trigger the tracking reference signal configuration for the set of UEs.

Aspect 44 may include the method of any of aspects 41-43, where the tracking reference signal configuration includes a set of parameters, the set of parameters including a length of a tracking reference signal burst in a quantity of slots, a tracking reference signal burst periodicity in the quantity of slots, a quantity of symbols for the tracking reference signal within a slot, a tracking reference signal bandwidth, a tracking reference signal subcarrier spacing, or a tracking reference signal symbol spacing within the slot.

Aspect 45 is a system or apparatus including means for implementing a method or realizing an apparatus as in any of aspects 41-43.

Aspect 46 is a non-transitory computer-readable medium storing instructions executable by one or more processors to cause the one or more processors to implement a method as in any of aspects 41-43.

Aspect 47 is a system including one or more processors and memory in electronic communication with the one or more processors storing instructions executable by the one or more processors to cause the system or apparatus to implement a method as in any of aspects 41-43.

Examples of these aspects may be combined with examples or embodiments disclosed in other implementations.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a base station, a first tracking reference signal configuration associated with a first bandwidth part and a second tracking reference signal configuration associated with a second bandwidth part, the first tracking reference signal configuration comprising a first set of parameters and the second tracking reference signal configuration comprising a second set of parameters;
   identifying the first bandwidth part for communication with the base station over a first set of time resources and the second bandwidth part for communication with the base station over a second set of time resources, wherein the first set of time resources are different than the second set of time resources;
   selecting the first tracking reference signal configuration for the first set of time resources based at least in part on the first tracking reference signal configuration being associated with the first bandwidth part; and
   receiving, from the base station based at least in part on the selecting, a first tracking reference signal in accordance with the first tracking reference signal configuration.

2. The method of claim 1, further comprising:
   identifying the second bandwidth part for communication with the base station over the second set of time resources, the second bandwidth part associated with the second tracking reference signal configuration; and
   selecting the second tracking reference signal configuration for the second set of time resources based at least in part on the second tracking reference signal configuration being associated with the second bandwidth part.

3. The method of claim 2, further comprising:
   receiving, from the base station, downlink control information including an indication of the second bandwidth part.

4. The method of claim 2, further comprising:
   determining that a timer associated with the first bandwidth part has expired, wherein switching from the first bandwidth part to the second bandwidth part is based at least in part on the determining.

5. The method of claim 1, wherein the first set of parameters, the second set of parameters, or both comprise a length of a tracking reference signal burst in a quantity of slots, a tracking reference signal burst periodicity in the quantity of slots, a quantity of symbols for the tracking reference signal burst within a slot, a tracking reference signal bandwidth, a tracking reference signal subcarrier spacing, or a tracking reference signal symbol spacing within the slot.

6. A method for wireless communications at a user equipment (UE), comprising:
   transmitting, to a base station, a first message of a random access channel procedure;
   receiving, from the base station, a remaining minimum system information (RMSI) in response to transmitting the first message, the RMSI comprising an indicator for triggering a tracking reference signal transmission; and
   receiving, from the base station, a tracking reference signal in accordance with a tracking reference signal configuration indicated by the RMSI.

7. The method of claim 6, wherein the RMSI indicates the tracking reference signal configuration.

8. The method of claim 6, wherein the tracking reference signal configuration comprises a set of parameters, the set of parameters comprising a length of a tracking reference signal burst in a quantity of slots, a tracking reference signal burst periodicity in the quantity of slots, a quantity of symbols for the tracking reference signal within a slot, a tracking reference signal bandwidth, a tracking reference signal subcarrier spacing, or a tracking reference signal symbol spacing within the slot.

9. An apparatus for wireless communications at a user equipment (UE), comprising:
   one or more processor,
   one or more memories coupled with the one or more processors; and instructions stored in the one or more memories and executable by the one or more processors to cause the apparatus to:
  receive, from a base station, a first tracking reference signal configuration associated with a first bandwidth part and a second tracking reference signal configuration associated with a second bandwidth part, the first tracking reference signal configuration comprising a first set of parameters and the second tracking reference signal configuration comprising a second set of parameters;
  identify the first bandwidth part for communication with the base station over a first set of time resources and the second bandwidth part for communication with the base station over a second set of time resources, wherein the first set of time resources are different than the second set of time resources;
  select the first tracking reference signal configuration for the first set of time resources based at least in part on the first tracking reference signal configuration being associated with the first bandwidth part; and
  receive, from the base station based at least in part on the selecting, a first tracking reference signal in accordance with the first tracking reference signal configuration.

10. The UE of claim 9, wherein the one or more processors are individually or collectively further operable to execute the code to cause the UE to:
  identify the second bandwidth part for communication with the base station over the second set of time resources, the second bandwidth part associated with the second tracking reference signal configuration; and
  select the second tracking reference signal configuration for the second set of time resources based at least in part on the second tracking reference signal configuration being associated with the second bandwidth part.

11. The UE of claim 10, wherein the one or more processors are individually or collectively further operable to execute the code to cause the UE to:
  receive, from the base station, downlink control information including an indication of the second bandwidth part.

12. The UE of claim 10, wherein the one or more processors are individually or collectively further operable to execute the code to cause the UE to:
  determine that a timer associated with the first bandwidth part has expired, wherein switching from the first bandwidth part to the second bandwidth part is based at least in part on the determining.

13. An apparatus for wireless communications at a user equipment (UE), comprising:
  one or more processors,
  one or more memories coupled with the one or more processors; and
  instructions stored in the one or more memories and executable by the one or more processors to cause the apparatus to:
    transmit, to a base station, a first message of a random access channel procedure;
    receive, from the base station, a remaining minimum system information (RMSI) in response to transmitting the first message, the RMSI comprising an indicator for triggering a tracking reference signal transmission; and
    receive, from the base station, a tracking reference signal in accordance with a tracking reference signal configuration indicated by the RMSI.

14. The apparatus of claim 13, wherein the RMSI indicates the tracking reference signal configuration.

15. The apparatus of claim 13, wherein the tracking reference signal configuration comprises a set of parameters, the set of parameters comprising a length of a tracking reference signal burst in a quantity of slots, a tracking reference signal burst periodicity in the quantity of slots, a quantity of symbols for the tracking reference signal within a slot, a tracking reference signal bandwidth, a tracking reference signal subcarrier spacing, or a tracking reference signal symbol spacing within the slot.

* * * * *